Feb. 27, 1940. W. F. GROENE 2,191,935
CRANKSHAFT LATHE
Filed May 2, 1939 19 Sheets-Sheet 12
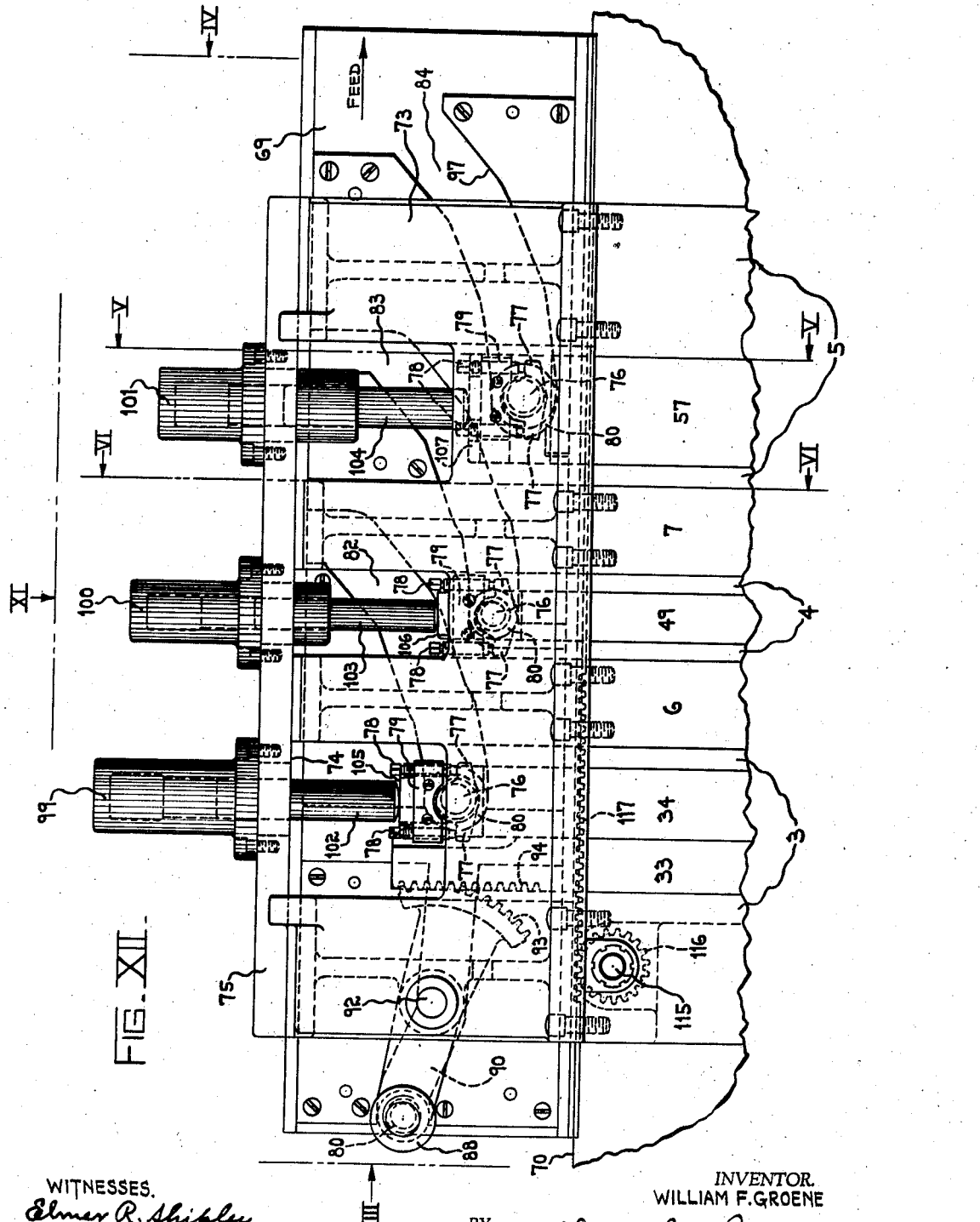
WITNESSES.
Elmer R. Shipley
Orlando S. Knox
INVENTOR.
WILLIAM F. GROENE
BY Willard L. Groene
ATTORNEY.

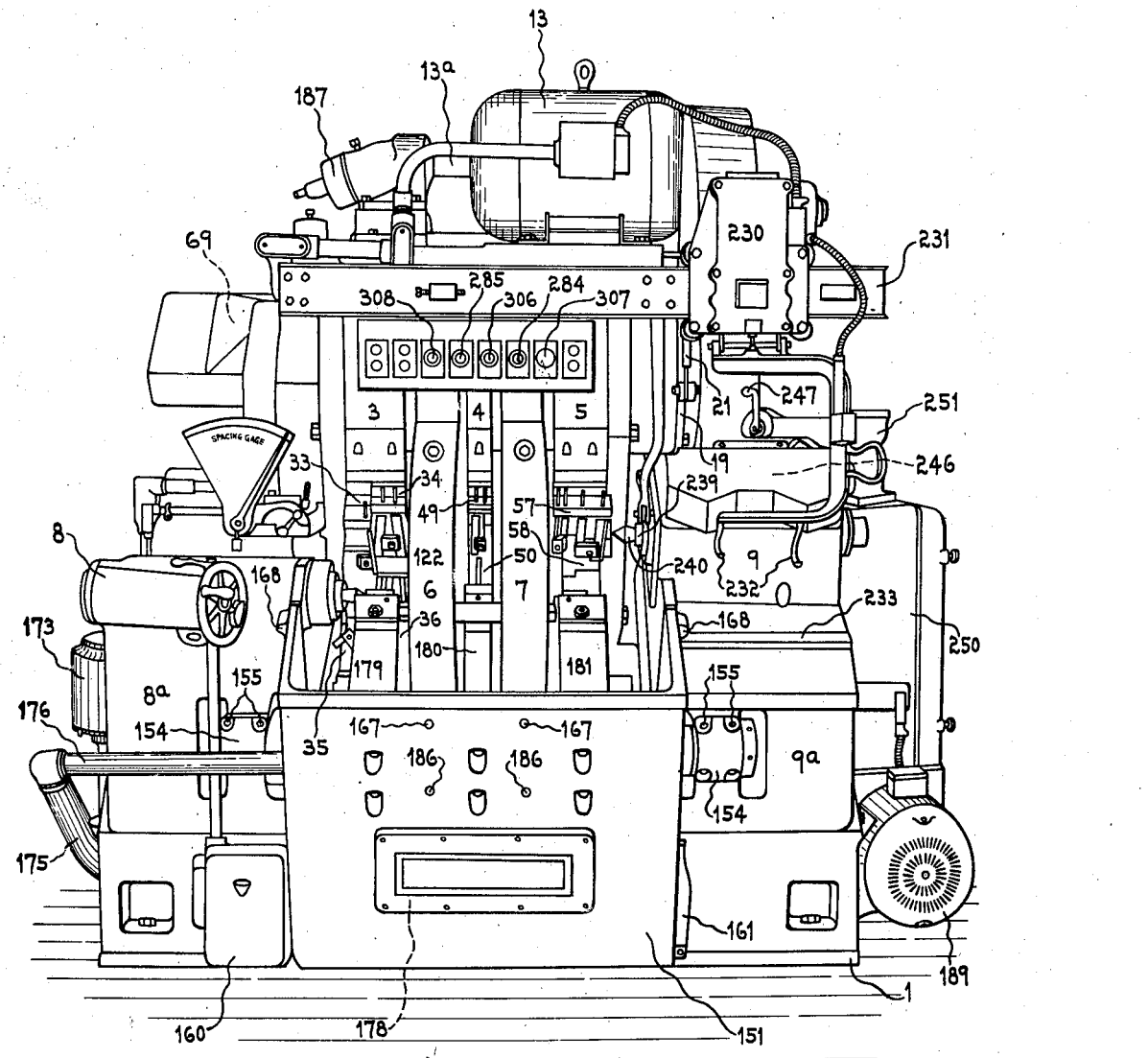
Fig. I

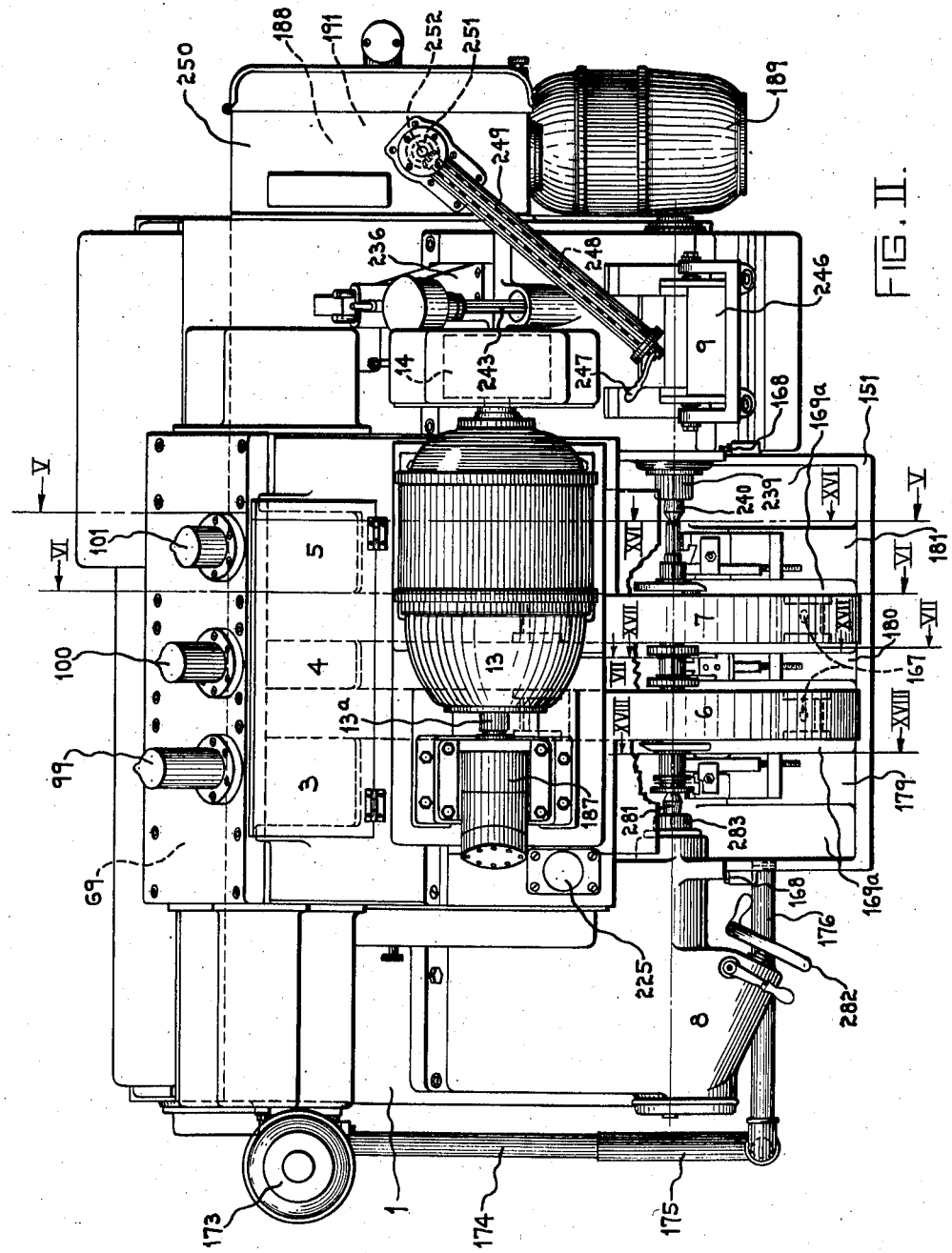

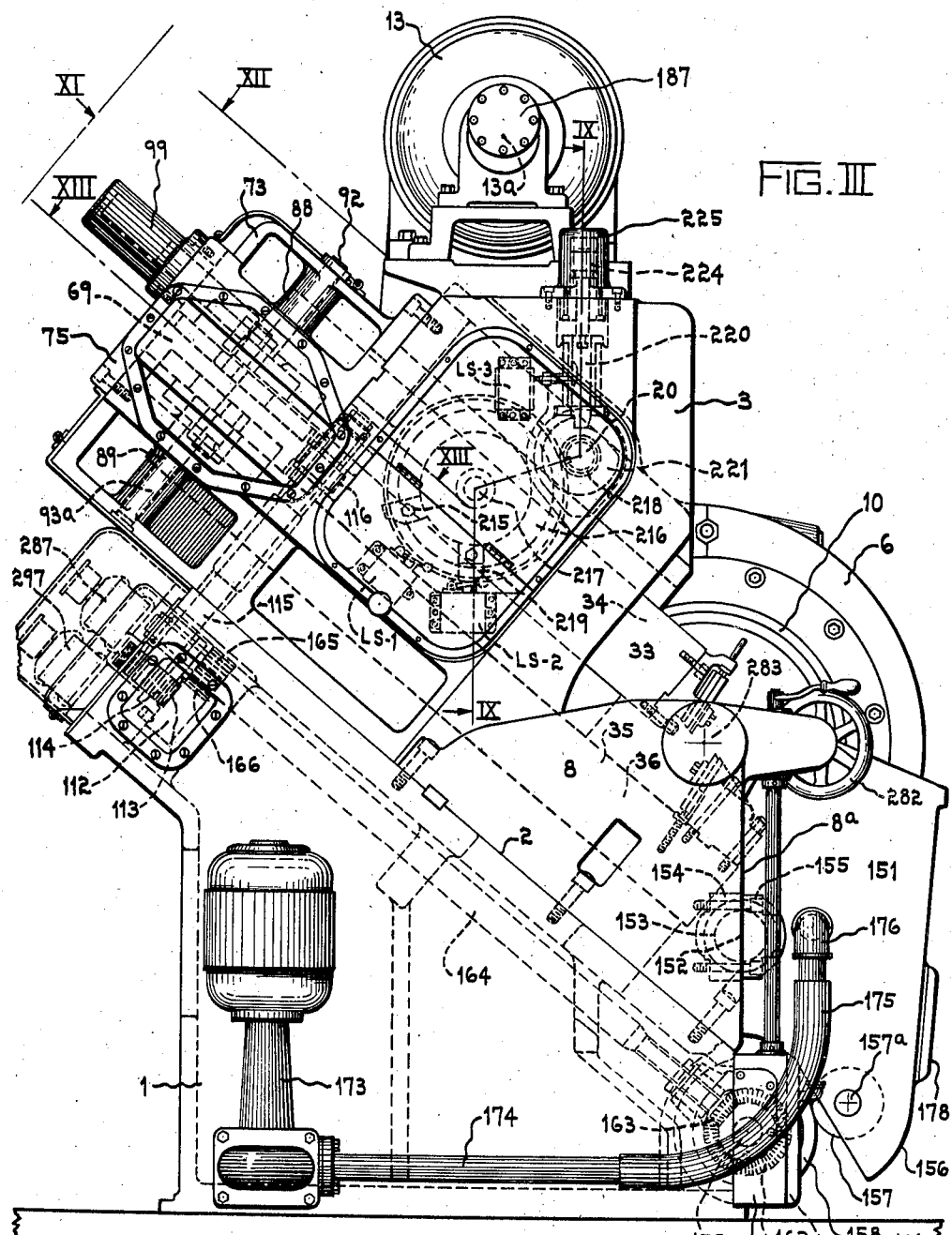

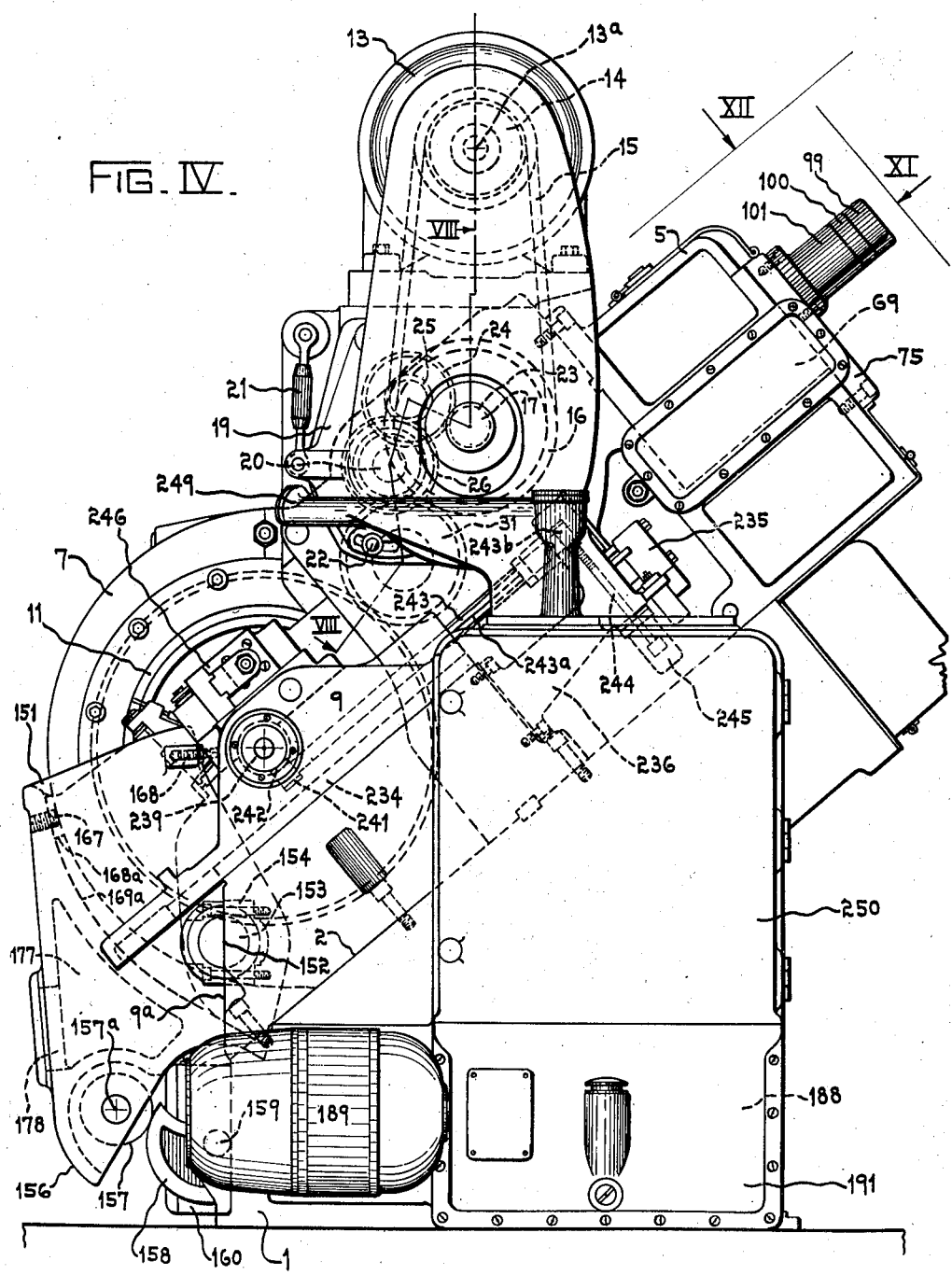

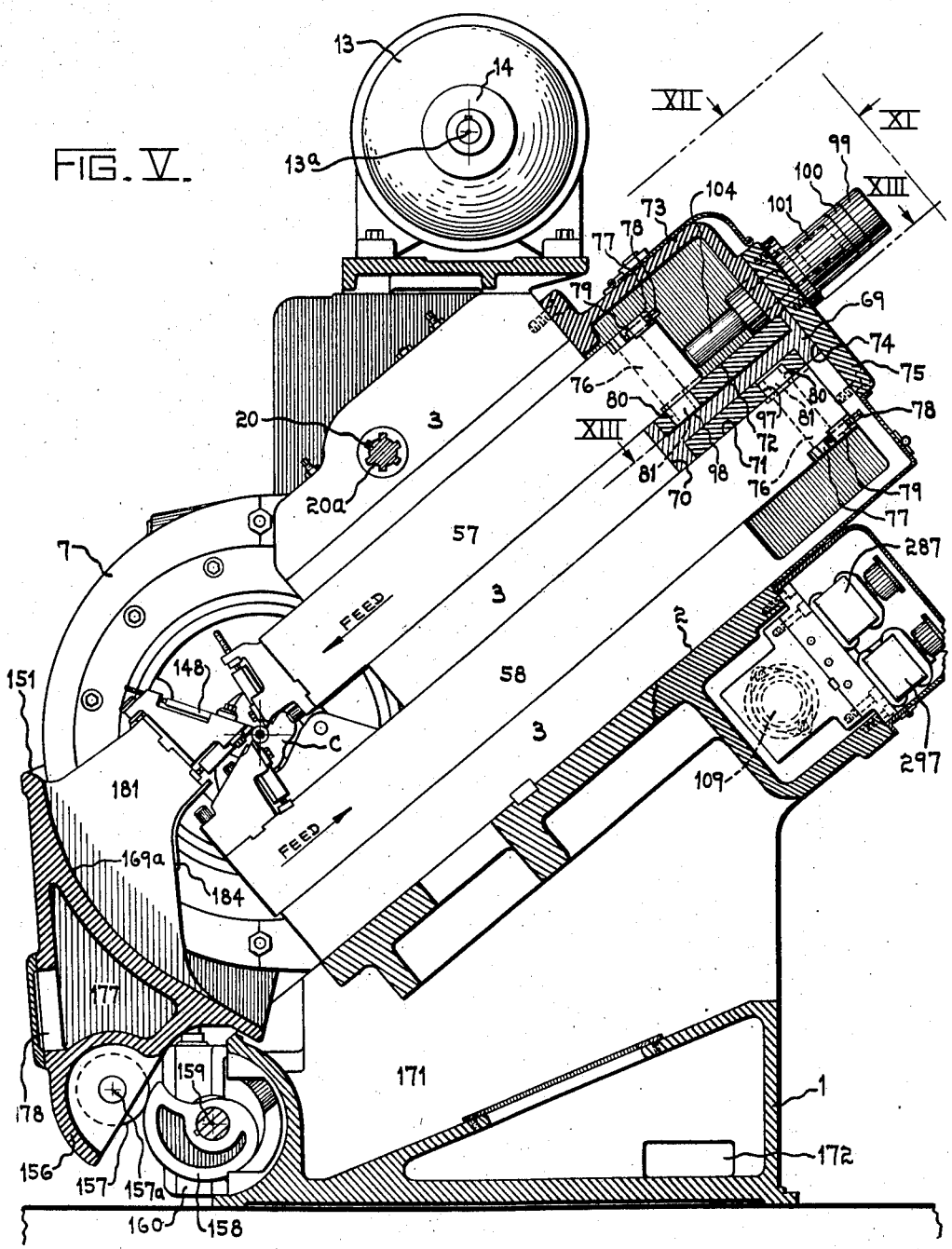

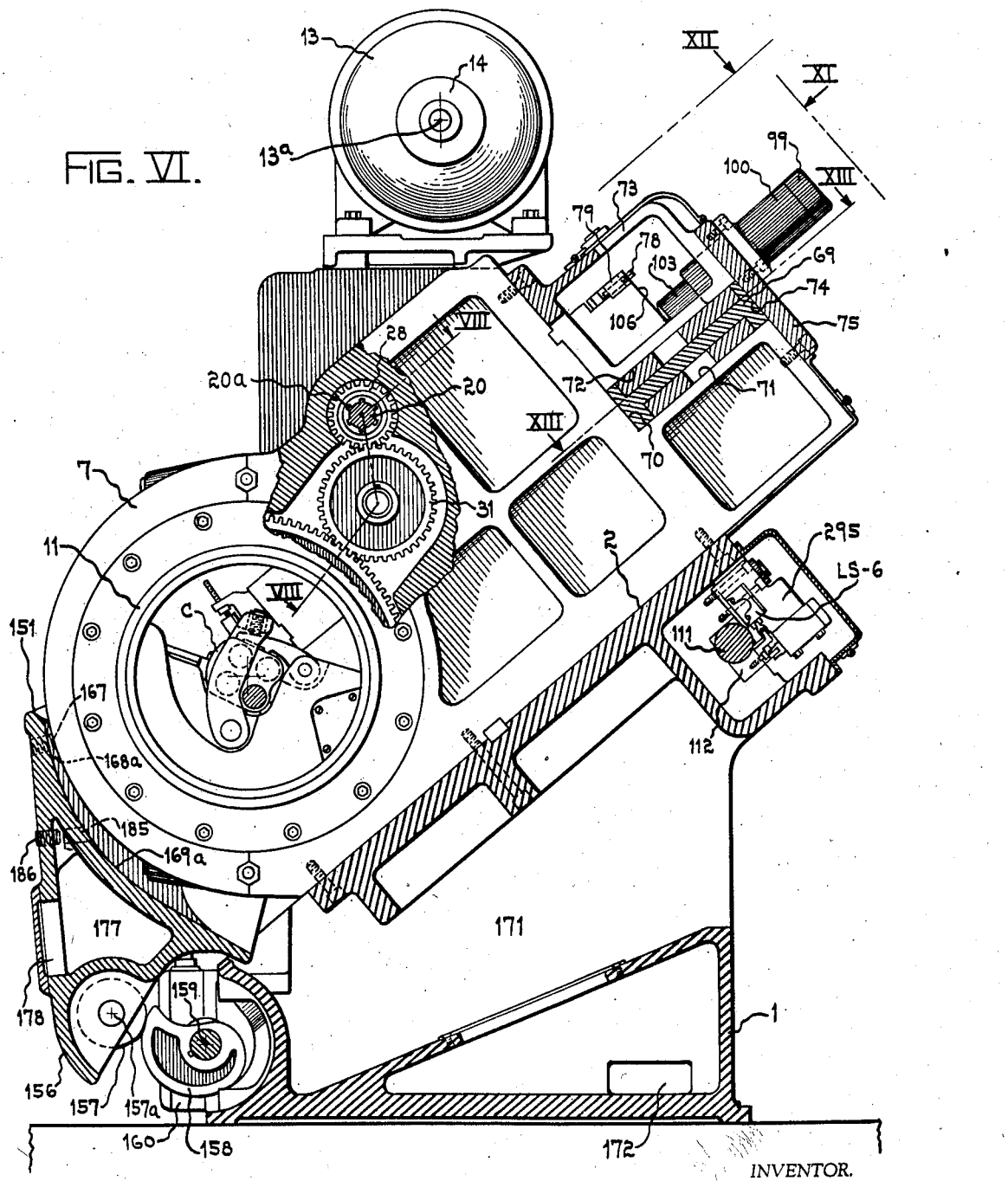

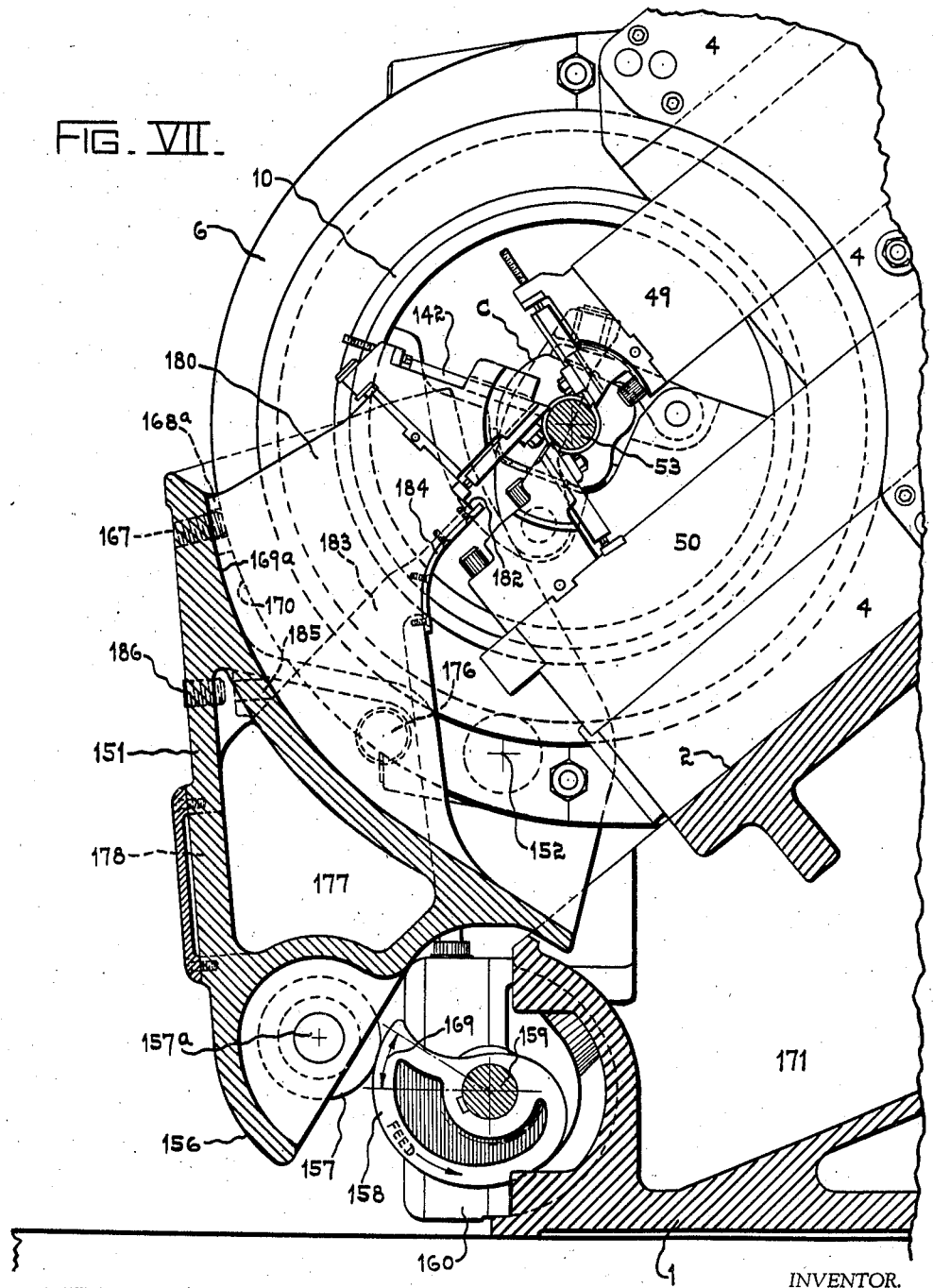

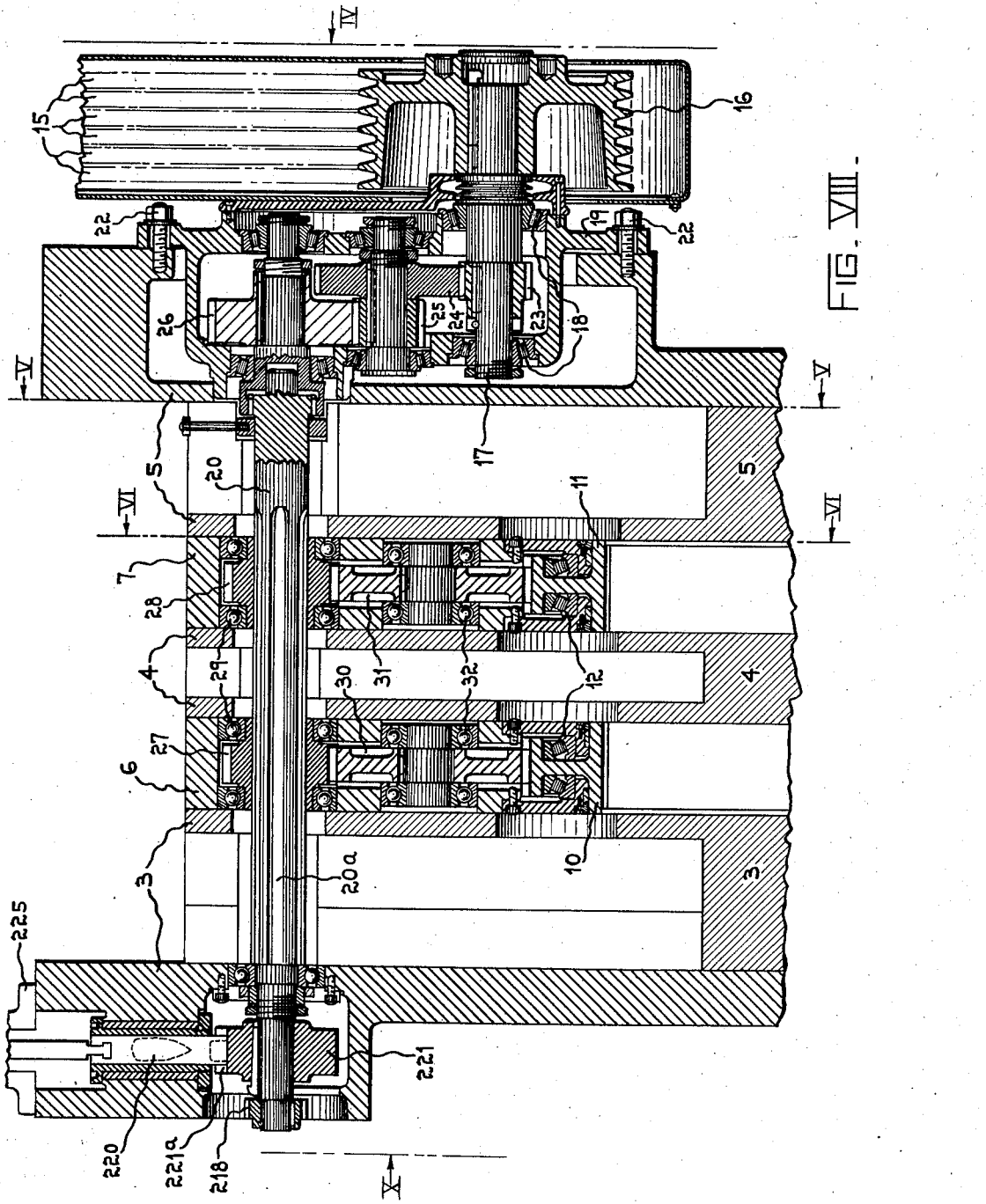

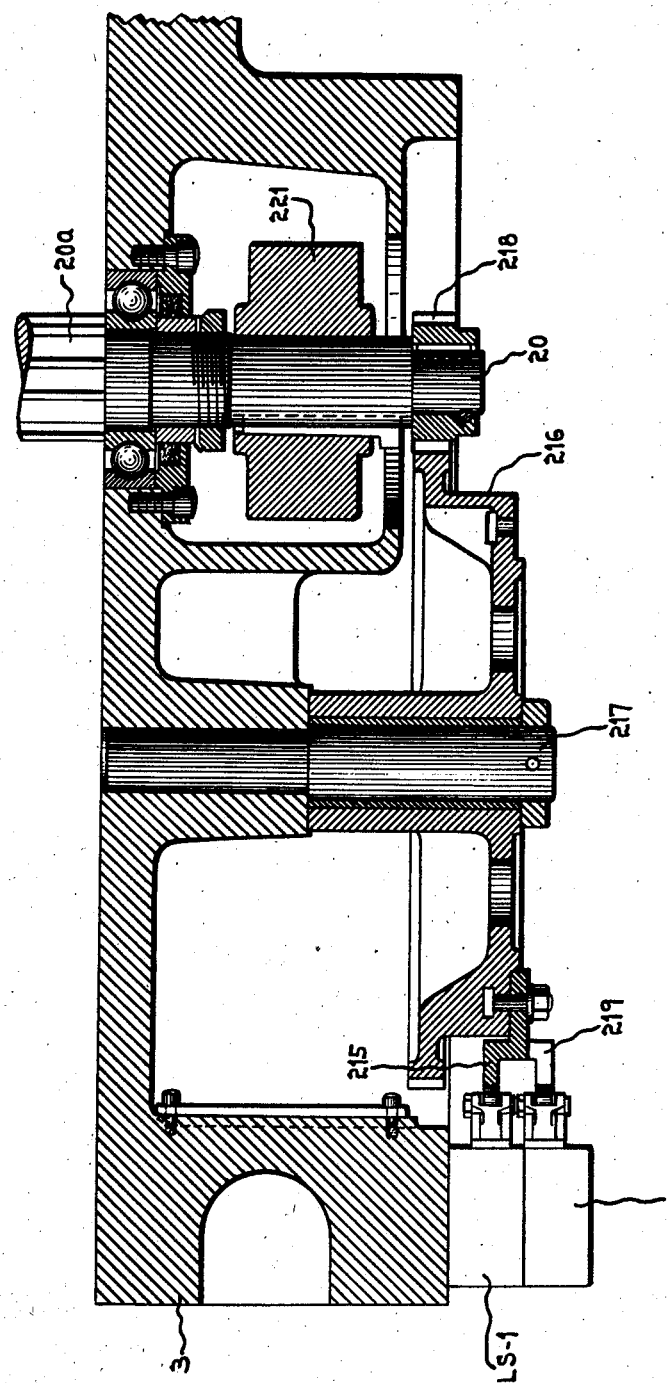

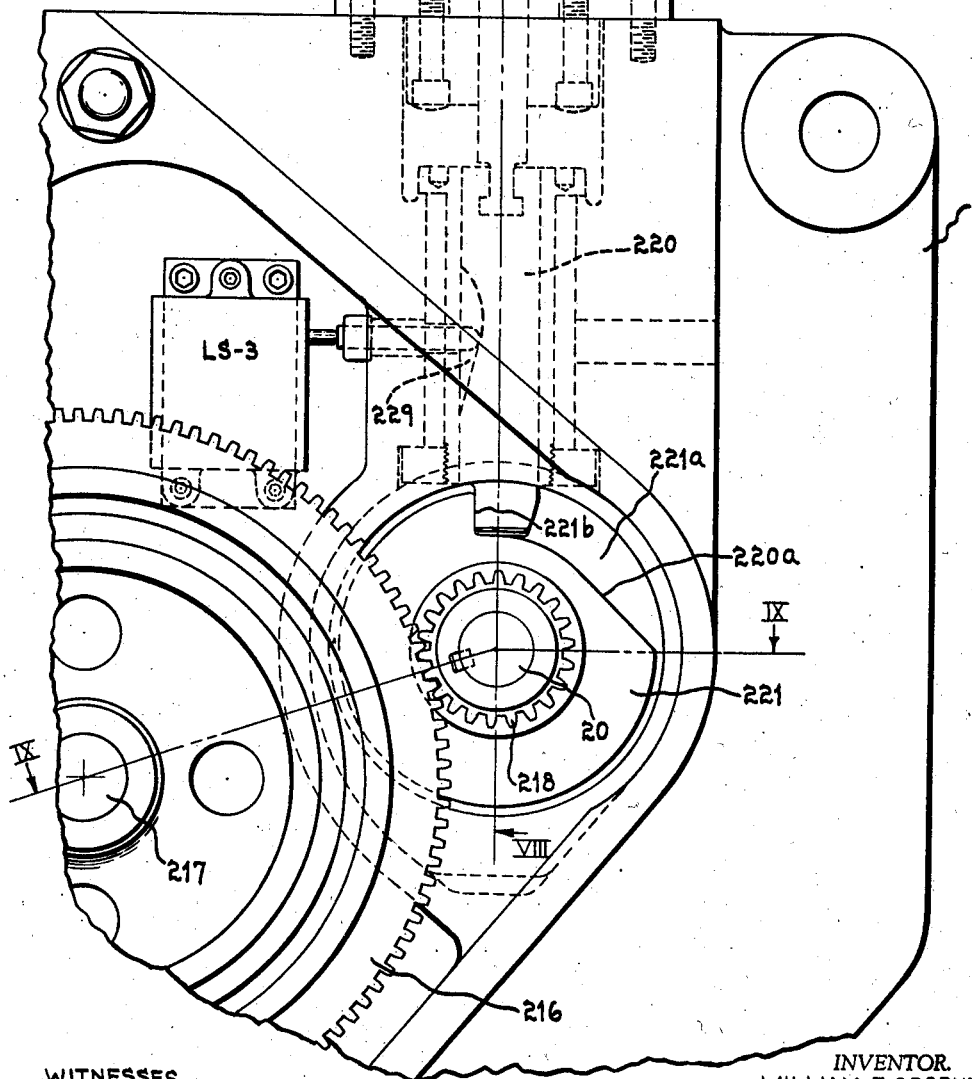

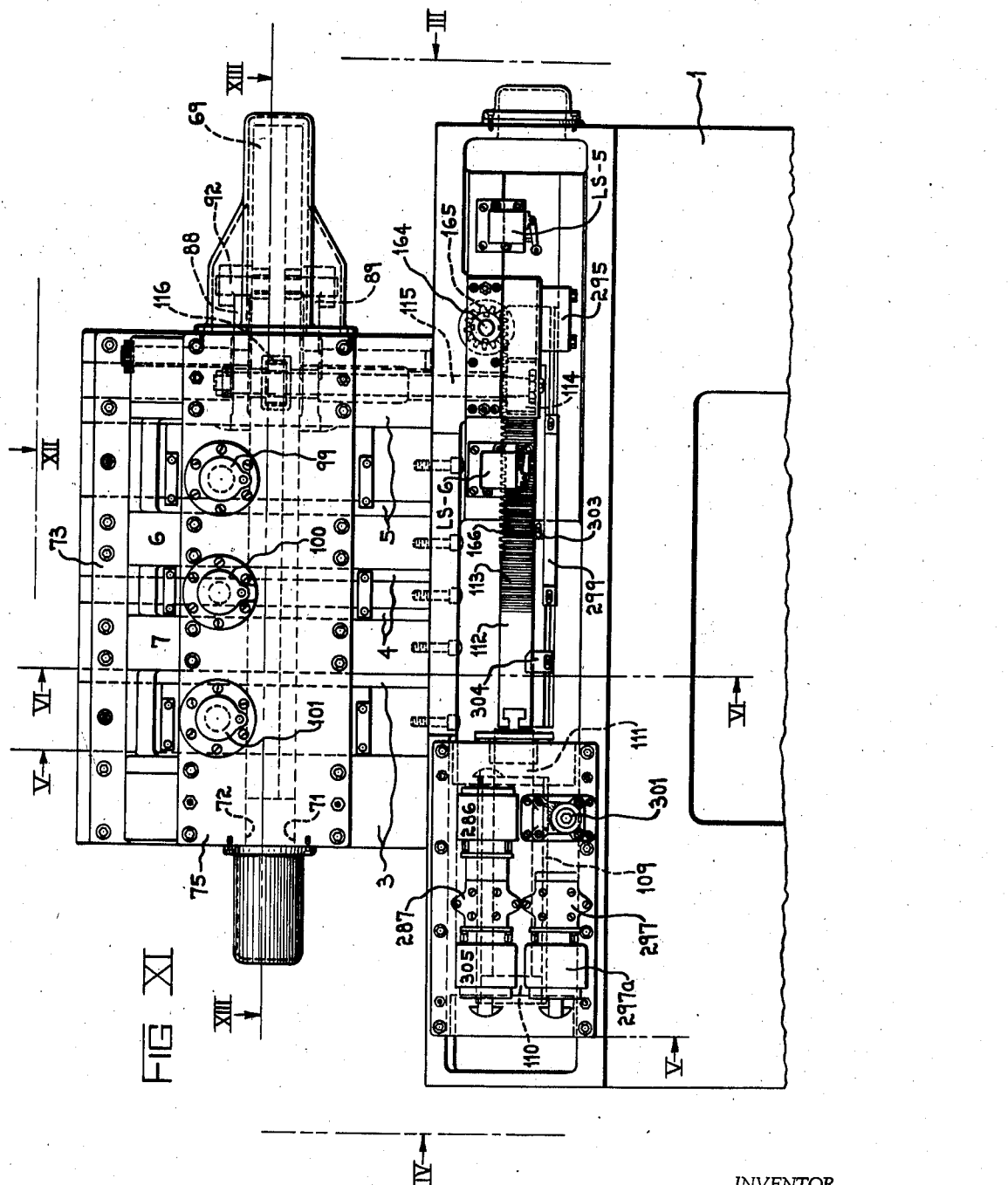

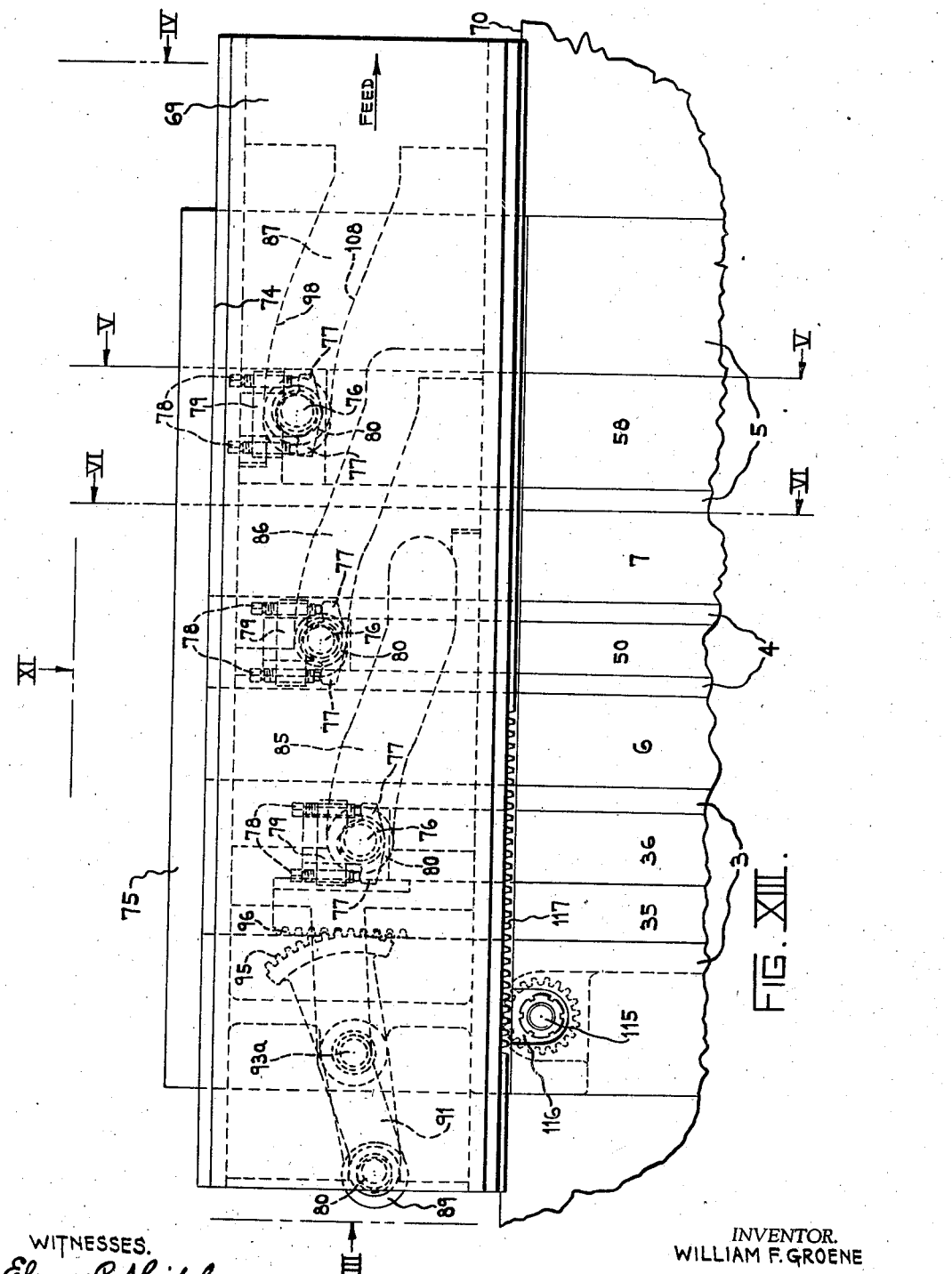

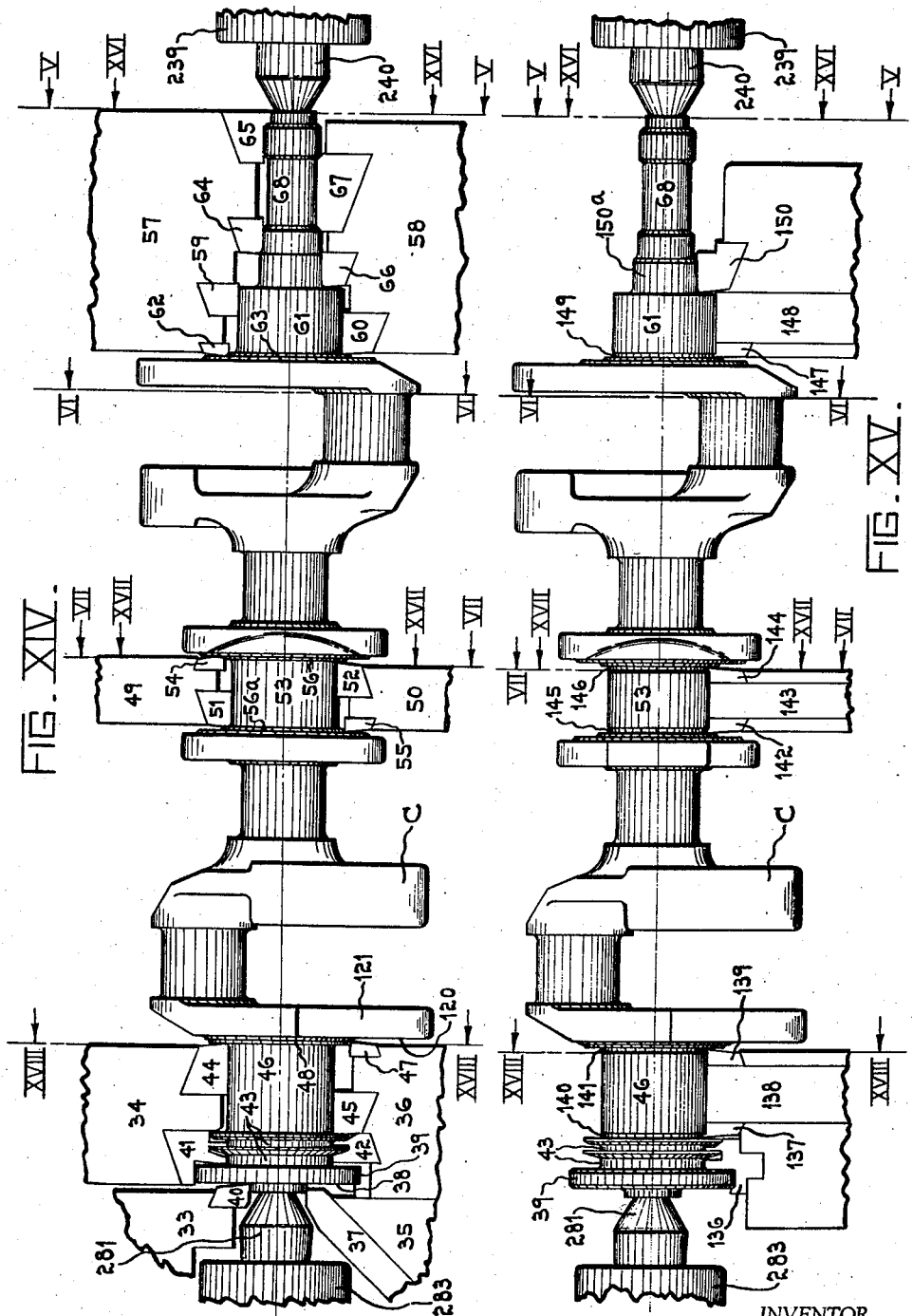

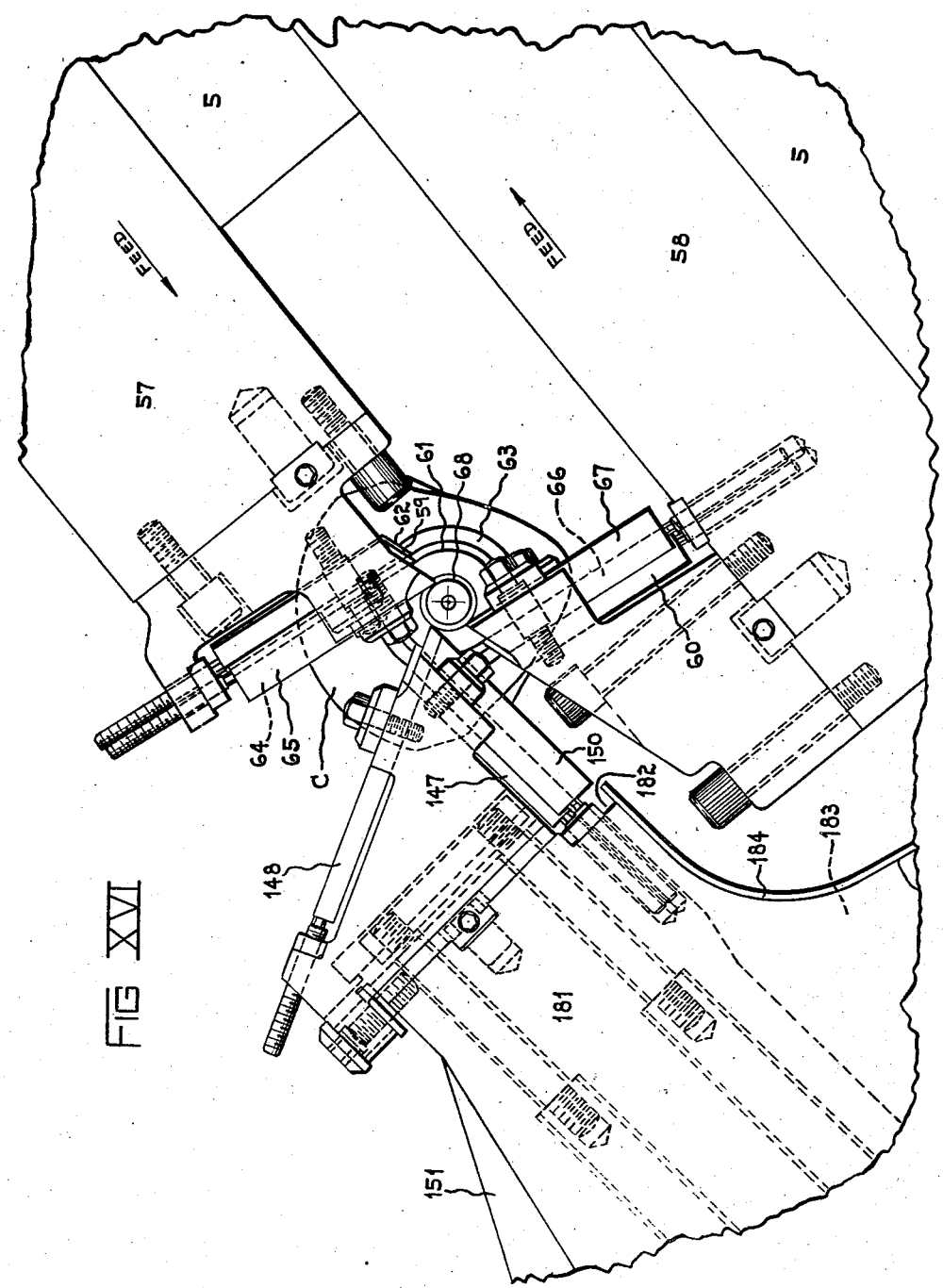

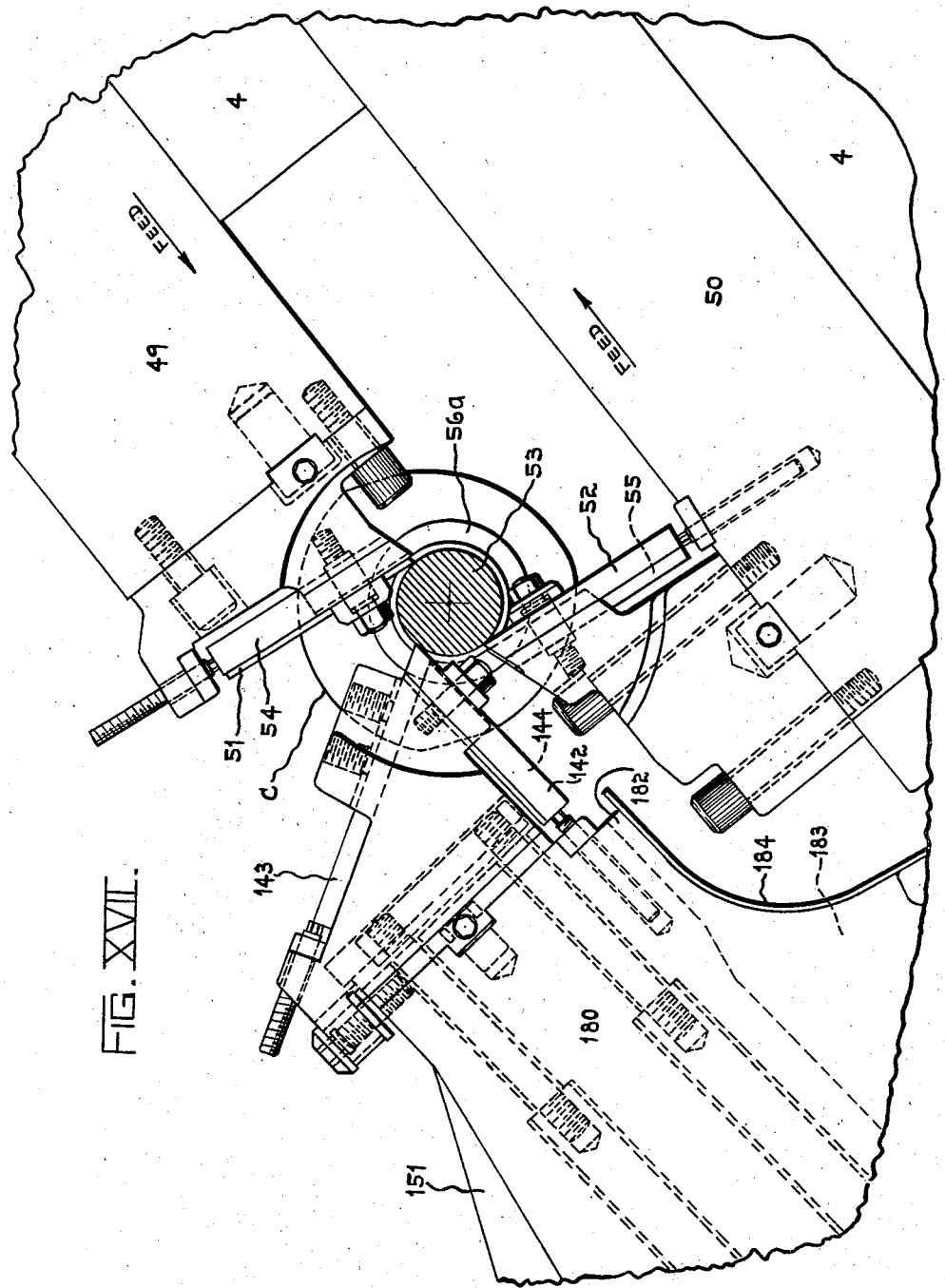

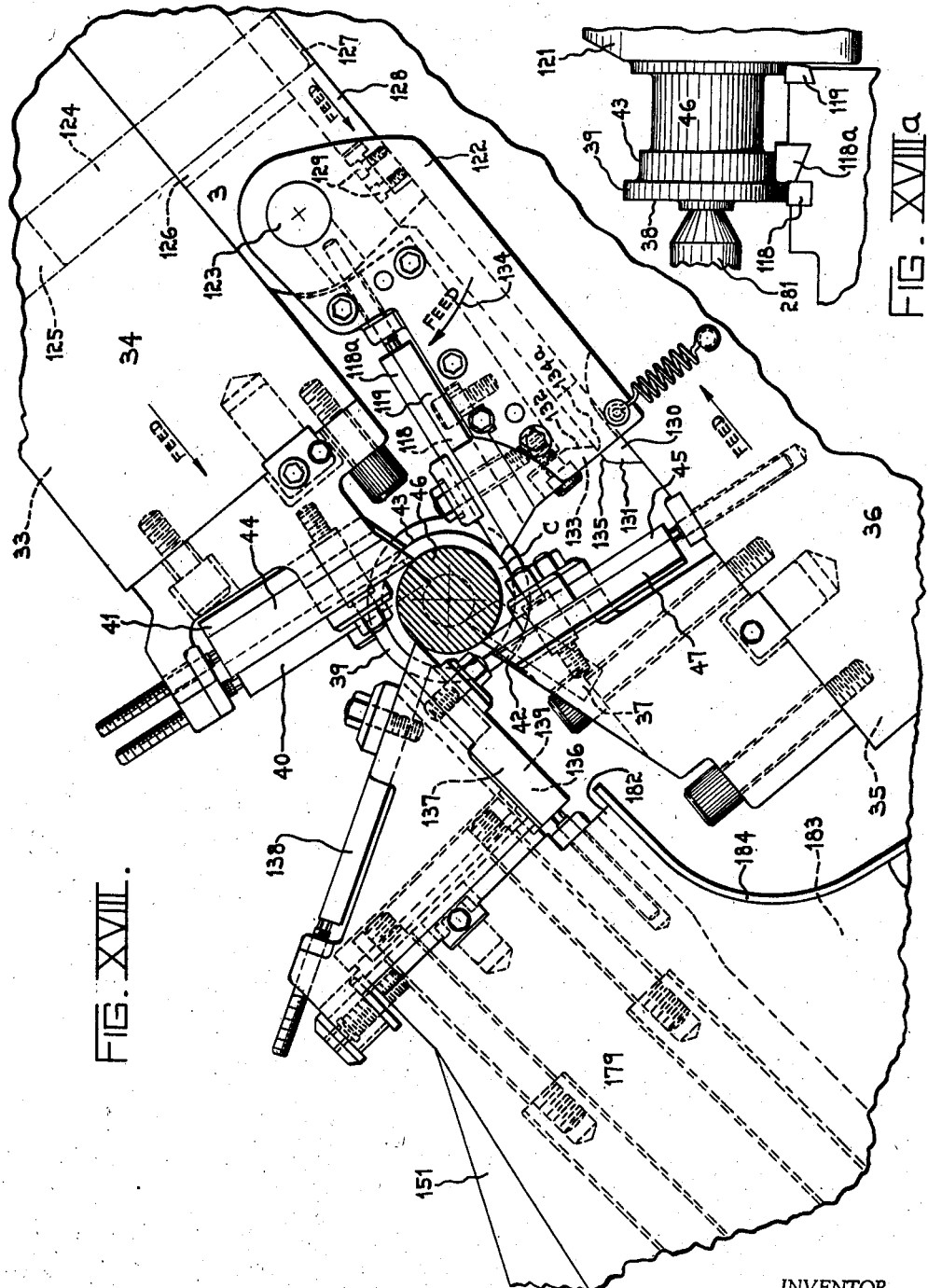

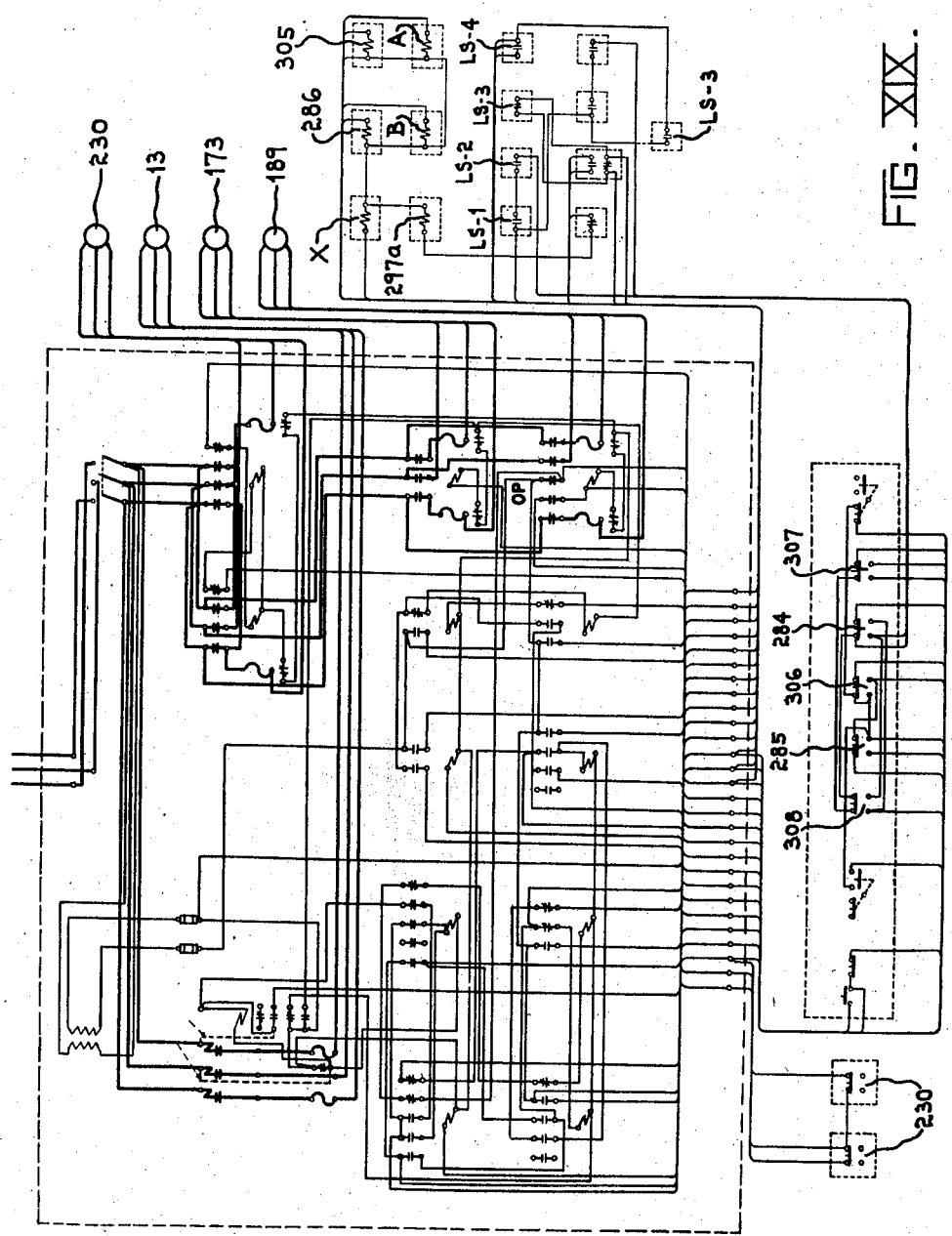

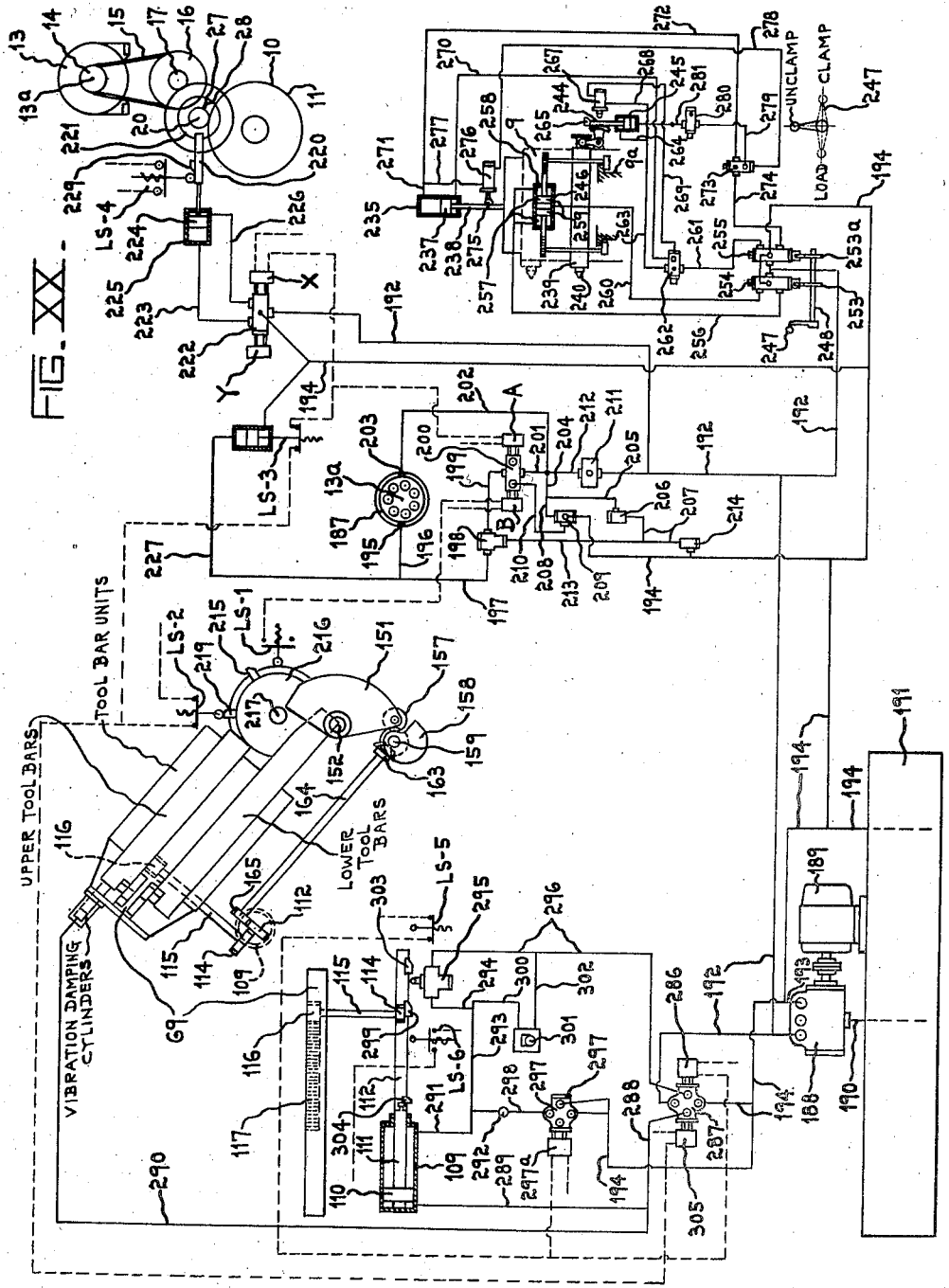

Patented Feb. 27, 1940

2,191,935

UNITED STATES PATENT OFFICE 2,191,935

CRANKSHAFT LATHE

William F. Groene, Cincinnati, Ohio, assignor to The R. K. Le Blond Machine Tool Company, Cincinnati, Ohio, a corporation of Delaware Application May 2, 1939, Serial No. 271,304

37 Claims. (Cl. 82—9)

This invention pertains to lathes, and more particularly to the type of lathes known as center drive crankshaft lathes for simultaneously machining all of the line bearings, flange and stub ends, of internal combustion engine crankshafts. A crankshaft is a difficult and delicate work piece to machine and it must be turned with great accuracy and particular smoothness for the finished surfaces. Because of the limberness and tendency of crankshaft to bend, twist, and warp during the cutting operation, great difficulty is experienced with destructive chatter and vibration which is set up between work and tool during the cutting operation. This results in inaccurate machining of the work piece and in unsatisfactory finish for the completed surfaces. It has been found, however, that by providing certain vibration damping means in connection with the tool feeding mechanism that this chatter is eliminated by preventing the minute relative movement between the tool and work which is the source of the chatter.

One of the objects of this invention is to provide vibration damping means for the tool bars which feed the cutting tools to the work crankshaft to be machined. In a machine of this particular type large numbers of cutting tools are applied to the crankshaft from various different directions which results in excessive strain being imparted to the work because of the large amount of metal being removed in a very short space of time. It is, therefore, found that this vibration damping arrangement is absolutely essential to the successful operation of a machine capable of performing the high productive operations of the machine herein set forth.

Another object of this invention is to provide means for feeding tools from various directions relative to the work piece in which all of the back lash in feeding mechanism is eliminated and vibration damped out so that an absolutely positive forward feeding movement of the tool, without any minute reciprocating backward movement relative to the work being turned, is effected for positively forcing the cutting tools in a vibrationless manner into the work piece during the cutting cycle.

Another object of this invention is to provide sets of oppositely moving cutting tools for roughing out all of the line bearing portions of a crankshaft and to provide a third set of finishing tools coming in from a different direction for accurately finishing said rough turned portions during the rough turning of said portions so that no time is lost between roughing and finishing operations in the machine.

Still another object of this invention is to provide in a crankshaft lathe for turning all of the line bearings, flange and stub ends, of crankshafts, three sets of cutting tools operating from three different directions for roughing out all of the flange end of the crankshaft while other sets of tools rough out the line bearing portions and stub ends of said shaft, and to provide in addition to said mentioned tools, and operating simultaneously therewith, a set of finishing tools which complete the accurate machining of all of said line bearing portions of said work crankshaft.

Another object is to provide a cam feed mechanism for each individual tool actuating member of the lathe for roughing out all of the line bearing portions of a crankshaft, said cam mechanism being carried in the tool units and center drive ring gear housings which form a solid block of metal in the lathe. This cam feed mechanism is arranged so as to effect variable and independent feeding movements for each of the cutting tools of the lathe so as to reduce the turning of all of the various different line bearing portions of the crankshaft to a minimum of cutting time.

Another unique feature of this invention is to provide a unique tool feeding cradle associated with the roughing tools for completely finish turning all of the line bearing portions of a crankshaft. This finishing tool cradle incorporates the features of supporting and feeding of the finishing tools to the work piece, serves as the chip pan and guard for the front of the lathe, and also provides the coolant distributing system for all of the cutting tools of the lathe.

Another object of this invention is to provide a finishing tool feeding device which is cam fed and which is stopped in accurate feed position for sizing the work to accurate finished dimensions by means of a positive abutment on the frame of the machine.

Also incorporated with this finishing tool feeding cradle is resilient vibration damping means which absorbs all vibration from said cradle during its feeding movement to the abutment for accurately sizing the work piece.

Further objects and advantages of my invention will be set forth in the description of the drawings in which:

Figure I is a front perspective view of a center drive lathe embodying the principles of my invention.

Figure II is a plan view of the machine shown in Figure I.

Figure III is a left hand end elevation of the machine of Figure I indicated by the line III—III on Figures XI, XII and XIII.

Figure IV is a right hand end elevation of the machine of Figure I indicated by the line IV—IV on Figures VIII, XI, XII and XIII.

Figure V is a vertical transverse section through the machine on the line V—V of Figures II, VIII, XI, XII, XIII, XIV, and XV.

Figure VI is a vertical transverse section through the machine on the line VI—VI of Figures II, VIII, XI, XII, XIII, XIV, and XV.

Figure VII is an enlarged vertical transverse section through the finishing tool cradle on the line VII—VII of Figures II, XIV, and XV.

Figure VIII is a section through driving transmission for the center drive ring gears on the line VIII—VIII of Figures IV, VI, and X.

Figure IX is an enlarged section through the indexing disc and control dog gear for the ring gear drive mechanism on the line IX—IX of Figures III and X.

Figure X is an enlarged left hand end elevation of a portion of the machine to more clearly show the indexing mechanism for the ring gear drive mechanism as indicated by the line X in Figure VIII.

Figure XI is an enlarged view of a portion of the rear of the machine showing the hydraulically operated cam feeding mechanism for the tool shown in the direction indicated by the line XI—XI in Figures III, IV, V, VI, XII, and XIII.

Figure XII is a top view of the cam feed mechanism shown in the direction of the line XII—XII of Figures III, IV, V, VI, and XI.

Figure XIII is a section through the cam feed mechanism on the line XIII—XIII of Figures III, V, VI, and XI.

Figure XIV is a schematic drawing showing the application of the roughing tools to the line bearing portions of a crankshaft to be machined in the lathe.

Figure XV is a schematic diagram showing the application of the finishing tool to the line bearing portions of a crankshaft to be machined in the lathe.

Figure XVI is a transverse section through the work spindle axis of the lathe on the line XVI—XVI of Figures II, XIV, and XV showing the application of the cutting tools to the stub end line bearing portions of the crankshaft to be machined.

Figure XVII is a transverse section through the work spindle axis of the lathe on the line XVII—XVII of Figures II, XIV, and XV showing the application of the cutting tools to be intermediate line bearing of the crankshaft to be machined.

Figure XVIII is a transverse section through the work spindle axis of the lathe on the line XVIII—XVIII of Figures II, XIV, and XV showing the application of the cutting tools to the flange end line bearing portions of the crankshaft to be machined.

Figure XVIIIa is a schematic diagram showing the application of the roughing tools to the flange end portion of a crankshaft to be machined in the lathe.

Figure XIX is a wiring diagram for the lathe operating mechanism.

Figure XX is a diagrammatic layout of the control and operating mechanism and the essential elements in the machine.

The machine comprises a base 1 having an inclined surface 2 upon which are mounted the tool bar units 3, 4, and 5 (Figures V and XI), the center drive ring gear chuck housings 6 and 7 (Figures II and VI), and the tailstocks 8 and 9.

Power for rotating the center drive ring gears 10 and 11 journaled on suitable bearings 12 (Figure VIII) in the housings 6 and 7 is derived from the main drive motor 13 which transmits its power through the motor pulley 14, the belts 15, to the driving pulley 16 on the pulley shaft 17 journaled in bearings 18 in the belt tightener bracket 19. This bracket 19 is mounted on the tool bar unit 5 so as to swivel about the axis of rotation of the drive shaft 20 and to be locked in adjusted position as affected by the adjusting turnbuckle 21 by bolts 22. Suitable reduction gearing 23, 24, 25 and 26 in the bracket 19 interconnects the pulley shaft 17 and the drive shaft 20. Appropriate pinions 27 and 28 fitting on the splined portion 20a of the shaft 20 and journaled in bearings 29 in the housings 6 and 7 drive the idler gears 30 and 31 also journaled on bearings 32 in these housings, the idlers in turn driving the ring gears 10 and 11.

Referring particularly to Figure XIV, in order to rough turn all of the line bearing portions of the crankshaft C the tool bar unit 3 is provided with the upper tool bars 33 and 34 and the lower tool bars 35 and 36. The tool bar 35 carries the roughing tool 37 which roughs down the outside face 38 of the flange 39 while the bar 33 carries the finishing tool 40 to finish this face. The tool bars 34 and 36 carry the tools 41 and 42 for roughing out the oil slinger grooves 43, the tools 44 and 45 for turning the flange end line bearing 46, and the tool 47 for cheeking the web 48 adjacent the line bearing 46.

The tool bar unit 4 has the upper tool bar 49 and the lower tool bar 50 which carry the tools 51 and 52 for turning the intermediate line bearing 53 and the cheeking tools 54 and 55 for cheeking the webs 56 and 56a adjacent the line bearing 53.

The tool bar unit 5 has the upper tool bar 57 and the lower tool bar 58 which have the tools 59 and 60 for the stub end line bearing 61, the tool 62 for cheeking the web 63 adjacent the line bearing 61, and the various tools 64, 65, 66, and 67 for the various portions of the stub end 68.

Each of these tool bars is operable independently of each other and at variable and different rates of feed. Referring to Figures V, VI, XI, XII, and XIII, the double faced feed cam plate 69 is mounted to slide in a suitable guideway formed by the surfaces 70 and 71 of the tool bar units 3, 4, and 5 and the center drive housings 6 and 7, the surface 72 of the bracket 73 fixed on these units and housings, and the surface 74 of the cover plate 75 fastened to the units, housings, and the bracket 73. In the rear ends of each of the tool bars 34, 49, 57, 36, 50, and 58 is mounted a cam roller stud 76 which has integral lugs 77 engaged by adjusting screws 78 threaded in blocks 79 fixed to the tool bar so that these studs 76 may be adjusted through a small arc by manipulating the screws 78. A cam roller 80 is carried on an eccentric portion 81 of these studs 76 so that by adjusting the screws 78 the roller 80 may be moved longitudinally of its respective tool bar. The rollers 80 on the bars 34, 49, and 57 operate in the respective cam slots 82, 83, and 84 on the upper side of the cam plate 69 and the rollers 80 on the bars 36, 50, and 58 operate in the respective cam slots 85, 86, and 87 on the lower side of the cam plate 69. Each of these cam slots can be arranged to actuate its respective tool bar in a specific sequence of movements best suited for the individual tools and the characteristics of the particular part of the work piece being operated upon by the tools of each tool bar. Similarly the tool bars 33 and 35 are actuated from the cam plate by the rollers 80 carried on the respective levers 88 and 89 and operating in the cam slots 90 and 91. The lever 88 is pivotally mounted on a stud 92 fixed in the bracket 73 and has a segmental gear 93 formed integral therewith which engages a rack 94 formed in the tool bar 33. The lever 89 is pivotally mounted on a stud 93a fixed in the tool bar unit 3 and has a segmental gear 95 formed integral therewith which engages rack 96 formed in the tool bar 35.

The novel arrangement of vibration damping mechanism for the tool bars is best shown in Figures V and XII. It will be noted that the lower tool bar 58 is fed upwardly to the right by operation of its roller 80 in the cam slot 84, the roller during this feeding bearing against the surface 97 of the cam slot 84 which in turn forces the cam plate 69 firmly against the surface 70 of the tool bar unit 3. Thus a solid metal to metal contact is provided for the tool bar to oppose the reaction of the cutting tools against the work which takes place in the opposite direction from the feeding direction. Now it will be noted that the upper tool bar 57 feeds in the opposite direction from that of the lower tool bar 58. Thus normally its roller 80 operating in the slot 87 would bear against the surface 98 which would thereby apply an opposite and substantially equal force on the cam plate 69 from that applied by the tool bar 58. As a result, the cam plate 69 during the cutting operation would tend to move back and forth or float between the guideway surfaces 70 and 74 because of the necessary free sliding movement required between these surfaces and the cam plate 69. While this clearance between the cam plate and these surfaces is relatively small it is found that it is the source of very destructive chatter between the work and the tools and also causes excessive runout when turning work of the nature of crankshafts which must be finished very rapidly and accurately and with a high degree of finish.

In order to overcome the above difficulties and provide an absolutely chatter- and vibration-proof cutting action for the tool bars, a series of hydraulic vibration dampening cylinders 99, 100 and 101 mounted on the cover plate 75 are provided which have plungers 102, 103, and 104 bearing against the rear faces 105, 106, and 107 of the respective upper tool bars 34, 49, and 57. During the cutting cycle high fluid pressure is applied to these vibration damping cylinders 99, 100, and 101 of an amount in excess of any back pressure on the tool bars caused by the reaction of the tools on the work. Thus (Figures V and XIII) the roller 80 on the bar 57 will always be maintained against the surface 108 of the cam slot 87 to thereby cooperate with the lower tool bar 58 in maintaining the cam plate 69 in firm engagement with the surface 70. It has been found that by this arrangement really astonishing results have been obtained in the rate of production and accuracy of finish of the completed crankshaft, far excelling any previous results obtained in operations of this kind. The fact that no chatter whatever results in this arrangement—a fact which has been thoroughly proven in the operation of a lathe as shown in Figure I—has resulted in greatly increasing the life of the cutting tools and in very accurate holding of the crankshaft in the chucking devices during the cutting cycle, since the destructive chatter which tends to loosen the crankshaft in the chucks is wholly absent in the construction.

The source of power for actuating the feed cam plate 69 is derived from the hydraulic feeding cylinder 109 (Figures III and XI) having a piston 110 and rod 111 connected to the rack bar 112 which has a rack 113 engaging a pinion 114 fixed on the upwardly extending shaft 115 journaled in the base 1 and tool bar unit 5, a pinion 116 fixed on the shaft 115 (Figures XII and XIII) engaging a rack 117 formed in the cam plate 69.

In conjunction with the tool bar unit 3 a third set of roughing tools (Figures XVIII and XVIIIa) is provided which work in cooperation with the tools on the tool bars 34 and 36 so as to effect the roughing out of the complicated flange end portion of the crankshaft C at a rate commensurate with the turning of the intermediate line bearing and the stub end portions of the crankshaft. The cutting tool 118 rough turns the outside diameter of the flange 39, the tool 118a rough turns the outside diameter of the oil slinger 43, and the tool 119 rough cheeks the face 120 of the web 121. These tools are carried in a tool holder 122 which is pivotally mounted on the pin 123 fixed in the tool bar unit 3. The tool holder 122 is actuated by the movement of the upper tool bar 34 through the pin 124 fixed in the bore 125 in the tool bar 34 and projecting downwardly through a clearance hole 126 in the tool bar unit 3 into the bore 127 in the slide bar 128 which is arranged to slide in the unit 3 on top of the tool bar 36. Appropriately connected to the slide bar 128 at 129 is the cam piece 130 having the angular cam surface 131 which engages the abutment surface 132 of the abutment block 133 fixed to the tool holder 122. Thus as the tool bar 34 feeds to the work the cam piece 130 likewise moves downward on the bar 36 to actuate the tool holder 122 as indicated by the arrow 134, the surface 134a of the abutment block 133 riding on top of the surface 135 of the cam piece 130 to effect a dwell for the tools at the end of the cutting cycle.

Operating in conjunction with the roughing tools above described are the finishing tools shown in Figure XV. The cutting tool 136 finish turns the oil slinger grooves 43 and finish turns and chamfers the outside diameter of the flange 39 while the tools 137, 138, and 139 finish turn the line bearing 46 and neck the associated fillets 140 and 141. The tools 142 and 143, and 144 finish turn the line bearing 53 and neck the associated fillets 145 and 146. The tools 147 and 148 finish turn the line bearing 61 and neck the associated fillet 149 while the tool 150 finish turns the gear fit 150a.

These finishing tools are carried on a unique tool feeding cradle 151 best shown in Figure VII. This cradle is pivotally mounted at 152 by suitable integral trunnions 153 carried in journal boxes 154 fixed to the front of the bases 8a and 9a of the tailstocks 8 and 9 by suitable screws 155. At each end of the downwardly extending apron portion 156 of the cradle 151 are rotatably mounted the cam rollers 157 on pins 157a which contact the periphery of the feed cams 158 carried on the cam shaft 159 appropriately journaled in brackets 160 and 161 on the front of the base 1 of the lathe. The shaft 159 has a bevel gear 162 (Fig. III) fixed onto its left hand end which is driven by a bevel pinion 163 on the upwardly extending drive shaft 164 journaled in the base 1. On its upper end this shaft 164 has a pinion 165 which is actuated by the rack 166 (Figure XI) on the rack bar 112 which is operated by the feeding cylinder 109 as described above.

A unique feature of this tool feeding cradle is that it is fed against positive abutments by means of the cams 158 to effect a positive and accurate stop for dwell in sizing the work. As the cams 158 rotate counter-clockwise (Figure VII) in feeding the cradle tools (Figure XV) to the work the abutment screws 167 strike against the center drive housings 6 and 7 while at the same time the abutment screws 168 strike against the tailstocks 8 and 9. The "land" or "dwell" portion 169 of the cams 158 are arranged to apply a heavy pressure on the rollers 157 after the abutment screws contact their stops so as to put the cradle in tension during the dwell of the tools on the work, this significant feature prevents any chatter or vibration during the final sizing of the work by these tools, these finishing tools cutting the work slightly below that roughed out by the roughing tools (Figure XIV).

In conjunction with the above positive and chatterless dwell arrangement, a vibration damping means is also provided for preventing chatter while the cradle is feeding the tools to the work. This comprises a resilient piece of material 168a (rubber or the like) surrounding the abutment screws 167 which engages the surface 169a of the cradle and the surface 170 of the center drive housings and is thereby compressed as the cradle feeds the tools into the work, thus damping out any vibration in the cradle during the cutting operation until the various abutment screws hit their stops.

Another unique feature of this cradle 151 is that it forms the coolant distributing system for the cutting tools of the lathe. Coolant in the chip compartment 171 in the base 1 of the lathe passes through the outlet 172 into the coolant pump 173 from which it is discharged through the pipe 174, the flexible hose 175, into the pipe 176 connected to the manifold compartment 177 formed in the cradle 151. This substantially triangular compartment 177 extends the full width of the cradle 151 and has an access opening 178 for removing sediment from this chamber. Formed integral with the arcuate surface 169 of the cradle are the tool block pedestals 179, 180, 181 each of which pedestals have coolant discharge outlets 182 connected to the manifold chamber 177 through passageways 183. A cover plate 184 provides the desired slotted opening at 182 to properly distribute a large volume of coolant to all of the cutting tools operating on the crankshaft without splashing. The arcuate surfaces 169 are kept washed clear of chips by coolant escaping from the openings 185, the flow through these openings being regulated as required by adjusting the screws 186. It can thus be seen that this cradle not only provides the coolant distributing means for the tools but also acts as the chip guard and apron for protecting the operator of the lathe. Thus a great saving is effected in the elimination of a supplementary coolant distributing system and chip guard while at the same time providing the proper discharge of the coolant on the tools and the adequate removal of the chips without attention on the part of the operator. It is also to be noted that by this arrangement the coolant distributing system in no way interferes with the adjustment or replacement of the cutting tools.

Noting particularly Figure XX, in conjunction with the main drive motor 13 is mechanism for stopping rotation of the center drive ring gears 10 and 11 in a predetermined position to facilitate loading and unloading of work in the lathe. The mechanism is of a character, for example, as shown in my application Serial Number 209,026 filed May 20, 1938, comprising a hydraulic braking motor 187 connected to the shaft 13a of the motor 13. The supply of fluid pressure for this hydraulic control mechanism may be derived from the hydraulic fluid pressure pump 188 driven by an electric motor 189 which draws fluid through the suction line 190 from the fluid reservoir 191 and delivers fluid under pressure through the pressure line 192. Drainage from a relief valve in the pump 188 for maintaining pressure in the line 192 is exhausted through the line 193 into the drain line 194 which returns fluid to the reservoir 191.

In the operation of the lathe, when the main drive motor 13 is operating driving the center drive ring gears 10 and 11 during the cutting operation, the hydraulic braking motor 187 is also being driven by the motor shaft 13a. Under these conditions fluid is discharged from the exhaust port 195 of the braking motor 187 through the lines 196 and 197, passes freely through the relief valve 198, through the line 199, the solenoid operated control valve 200, which is normally spring set in neutral position at this time, into the line 201, and then through the line 202 back to the intake port 203 of the braking motor 187 to form a closed circuit for free circulation of fluid at large volume when the motor 13 is running at full speed offering no resistance to the rotation of the braking motor 187. Fluid from this closed circuit may not escape through lines 204 and 205 because of the check valve 206 which only permits flow of fluid from the line 207 to the line 205. Nor may fluid escape through the line 208 from the line 204 since this latter line is at all times closed off at the control valve and serves only to supply fluid pressure for opening the valve 209 for connecting line 210 to the drain line 194, which connection is normally cut off by the spring set arrangement in the valve when the pressure drops in the line 208.

High pressure is maintained in the closed circulating circuit by pressure received from the pressure line 192 which passes through the speed control valve 211 which in turn discharges the high pressure fluid into the line 212 connected to said valve 211 at a definite relatively small volume for at all times maintaining the high pressure in the circuit and to make up for any leakage from said circuit. This discharge from the valve 211 is also utilized to rotate the hydraulic braking motor 187 at a definite slow speed for driving the electric motor 13 and the center drive ring gears 10 and 11 at slow speed preparatory to stopping said spindle or when jogging the spindle as will be described. The relief valve 198, while it at all times allows free flow between the lines 197 and 199, is so set at a pressure higher than that of the relief valve in the pump 188, or in other words than the pressure in the closed circuit, that fluid does not escape under these conditions through the bypass line 213, line 207, the check valve 214, and into the drain line 194.

Immediately upon disconnecting the electrical power from the motor 13 the otherwise inoperative limit switch LS—1 (Figure III) mounted on the tool bar unit 3 becomes effective through the usual relays and contactors and is engaged by a dog 215 on the trip dog gear 216 which is rotatably mounted on the stud 217 fixed in tool bar unit 3. This gear 216 is driven by a pinion 218 fixed on the end of the drive shaft 20, the ratio between this gear and pinion being such that the gear 216 rotates at exactly the same speed as the center drive ring gears 10 and 11. When the limit switch LS—1 is thus actuated by the dog 215, the solenoid B of the control valve 200 is energized, operating this valve so as to close off line 201 and to connect line 199 to line 210. This causes the pressure to drop to substantially zero in the lines 202, 204, 205 and 208 because the intake volume through the port 203 of the braking motor 187, which is being driven at a high rate of speed by the momentum of the electric motor 13 and the associated driving transmission and ring gears 10 and 11 is far in excess of that which can be supplied by the valve 211 through the line 212. Dropping the pressure in the line 208 causes the valve 209 to operate by its spring to close off the line 210 thus preventing fluid from passing through the line 199. Extremely high pressure is momentarily built up in lines 196 and 197 until the momentum in the electric motor and spindle transmission is absorbed by by-passing fluid through the high pressure relief valve 198 into the line 213. The discharge through the line 213 passes through the line 207, through the check valve 206 and into the line 205 due to the suction action set up in the lines 205, 204, and 202 by the rapid intake of the hydraulic braking motor. The check valve 214, which is arranged to prevent flow from drain line 194 to line 207, maintains the suction action through the check valve 206.

The hydraulic braking motor 187 will continue to decelerate in bypassing fluid through the valve 198 until it has slowed down to a point where the volume taken into the intake port 203 is equal to that being supplied through the line 212 from the valve 211. The valve 198 is so set as to effect the deceleration in about a half revolution of the work spindle. After the hydraulic braking motor 187 has decelerated to the above point pressure again builds up in the lines 202, 204, and 205, and 208 and the motor 187 is driven at a relatively slow speed for similarly rotating the work spindle by fluid from the line 212. Building up pressure in the line 208 again opens the valve 209 connecting line 210 to the drain line 194, allowing free flow of fluid through line 199 thus eliminating all back pressure at the exhaust port 195 of the hydraulic braking motor 187 which would otherwise hinder the operation of said motor 187 at the predetermined slow speed.

As soon as the limit switch LS—1 is operated the otherwise inoperative limit switch LS—2 mounted on the tool bar unit 3 (Figure III) is then rendered in a condition to be effective when operated. The limit switch LS—2 is operated when the dog 219 carried on the gear 216 engages it as the center drive ring gears are rotated at the predetermined slow speed by the hydraulic braking motor 187. Operation of the limit switch LS—2, through appropriate relays and contactors, causes the solenoid A of the control valve 200 to be operated which closes off the line 199 and connects the line 201 to the line 210. Flow through line 199 is thus stopped causing back pressure to substantially instantly build up in lines 196 and 197 to stop rotation of the hydraulic braking motor, and thus the work spindle center drive ring gears in a predetermined position depending on the setting of the dog 219 on the gear 216, from its slow rotating speed since the relief valve 198 is set at a greater pressure than that supplied to the port 203 of the hydraulic braking motor 187 by the line 212. Substantially no fluid would escape through the line 213 from the valve 198 under these conditions, thus providing very accurate stopping of the ring gears. The valve 209 under these conditions will merely float on the line 210 since the control pressure in the line 208 will be determined by spring pressure setting of the valve 209.

When the main drive electric motor 13 is again supplied with current, solenoid A is de-energized and the valve 200 allowed to come to its spring set neutral position and both limit switches LS—1 and LS—2 are rendered ineffective by the usual electrical relays and contactors so that the machine is then ready for repeating the above cycle of operation.

When it is desired to jog the center drive gears 10 and 11 it is only necessary to provide suitable electrical means for cutting out the limit switches LS—1 and LS—2 and to alternately energize one or the other of the solenoids A and B of the control valve 200 by means of the push button 308 (Figure I). When the solenoid B is energized the center drive gears rotate at a predetermined slow speed and when solenoid A is energized the center drive gears are substantially instantly stopped as described above.

In instances where it is desired to stop the work spindle in an accurate predetermined indexed position for purposes of utilizing certain types of loading and unloading arrangements for a lathe such for example as is shown in co-pending application Serial Number 209,738 filed May 24, 1938 an indexing plunger 220 adapted to engage an indexing disc 221 fixed on the drive shaft 20 (Figures III, VIII, and IX) is utilized. In such instances the use of the solenoid A and its functional effect on the control valve 200 is dispensed with and a second control valve 222 with an operating solenoid X is inserted in its place. The solenoid X is energized in the same way as the solenoid A by the limit switch LS—2 to operate the valve 222 so as to connect the fluid pressure line 192 to the line 222 to cause the indexing plunger 220 connected to the piston 224 in the cylinder 225 to be urged against the indexing disc 221. Exhaust fluid from the cylinder 225 under these conditions passes through line 226, the valve 222, and into the drain line 194. The dog 219 is arranged to operate the limit switch LS—2 just prior to the time when the notch 221a in the indexing disc 221 is in position for engagement by the indexing plunger 220. Thus the plunger bears against the periphery 220a of the indexing notch after limit switch LS—2 has operated, the plunger abutting against the surface 221b of the index disc 221 as the spindle transmission is rotated at slow speed by the hydraulic braking motor to instantly arrest rotation of the spindle and stop it in accurate predetermined indexed position. When the machine is stopped the surface 221b of the disc 221 is held in firm engagement with the plunger 220 by keeping solenoid B constantly energized so that the hydraulic braking motor keeps the shaft 20 and disc 221 rotated up against the plunger 220.

The solenoid Y of the valve 222 is adapted to be energized to connect the pressure line 192 to the line 226 and line 223 to the drain line 194 for withdrawing the indexing plunger 220 from the indexing disc 221 whenever the main driving motor 13 is energized or when the hydraulic braking motor 187 is rotating the spindle transmission slowly during jogging operations. In order to prevent damage to the machine in the event the indexing plunger 220 would be inserted in the disc 221 before the spindle transmission had completely decelerated to the slow speed, a pressure controlled limit switch LS—3 is connected in series with the limit switch LS—2 and is operated by pressure in the lines 196 and 197 through its connecting line 227 so as to render the limit switch LS—2 inoperative so long as there is pressure in the lines 196 and 197 during deceleration of the lathe transmission, the pressure dropping to substantially zero in these lines to allow the limit switch LS—3 and LS—2 to operate only when the hydraulic braking motor 187 has completely decelerated and is being driven at the predetermined slow speed from the hydraulic pump 188 as described. When it is desired to effect jogging movements in the work spindle the solenoids A and B of the control valve 200 may be alternately operated as described during which time the solenoid Y of the valve 222 is constantly energized to keep the indexing plunger 220 withdrawn from the disc 221.

A limit switch LS—4 mounted on the tool bar unit 3 and actuated by the cam surface 229 of the indexing plunger 220 has for one of its purposes the preventing of the application of electric power to the main drive motor 13 except when the indexing plunger is withdrawn from the disc 221 in order to prevent damage to the transmission mechanism for the center drive ring gears 10 and 11.

This machine is arranged so that work may be loaded or unloaded into the center drive ring gears 10 and 11 either by means of the loading crane 230 which travels on the rail 231 and carries the crankshaft on the hook 232 in a manner, for example, as shown in Patent 1,700,721 dated January 29, 1929 and in application Serial Number 244,224 filed December 6, 1938, or by a sliding rail loading arrangement 233 of a character shown in application Serial Number 209,738 filed May 24, 1938. In order to accommodate such loading arrangements, the tailstock 9 is arranged to slide radially of the axis of rotation of the center drive ring gears 10 and 11 on the base 9a of the tailstock on dovetail guideways 234 (Figure IV).

A hydraulic cylinder 235 mounted in a bracket 236 fixed to the base 9a has its piston 237 (Figure XX) and associated piston rod 238 connected to the tailstock 9 so as to reciprocate the tailstock 9 on the dovetail guideways 234. Mounted in the tailstock 9 is the tailstock barrel 239 having the usual center 240 adapted to move parallel with the axis of rotation of the center drive gears 10 and 11. This barrel 239 is axially reciprocated by a pinion 241 engaging a rack 242 (Figure IV) formed on the barrel 239 and fixed on a rock shaft 242 journaled in the tailstock 9. The outwardly projecting portion of the rock shaft 293 has splines 243a which slidingly engage in a splined bore of the pinion 241 journaled against axial movement in the tailstock 9. Mounted on the rock shaft 243 in the bracket 236 is a pinion 243b which is engaged by the piston rod 244 of the hydraulic cylinder 245 whereby fluid pressure actuation of the cylinder 245 effects movement of the tailstock barrel 239. In connection with this barrel 239 is a barrel clamping arrangement 246 for locking the barrel in position when its center 240 is engaged with the end of the crankshaft C.

The operation of this tailstock is effected by the control lever 247 carried on the shaft 248 in the bracket 249 which is mounted on the hydraulic control panel 250 attached to the right hand side of the base 1, the shaft 248 being connected by suitable bevel gearing 251 to the vertical actuating cam shaft 252 having cams 253 and 253a for actuating the respective valves 254 and 255.

When the control lever 247 is in the "Clamp" position (Figure XX) valve 254 is so actuated by the cam 253 that fluid pressure from the pump 188 passes through line 192, the valve 254, through line 256, and into the rod ends 257 of the cylinder 258 of barrel clamp 246 to actuate its piston 259 to effect clamping the barrel 239 in the tailstock 9 when in work engaging position. Drainage from the head end of the cylinder under these conditions returns through line 260, the valve 254 and into the drain line 194 to the reservoir 191.

After the work C has been machined the control lever is moved from the "clamp" position to the "unclamp" position whereupon valve 254 is actuated so as to deliver high pressure from line 192 to line 260 to actuate the pistons 259 to unclamp the barrel 239 from the tailstock 9, drainage from the other end of the cylinder 258 under these conditions returning through line 256, through the valve 254, into the drain line 194.

After having unclamped the tailstock barrel 239 the control lever 247 is then moved to "load" position whereupon fluid pressure from the line 192 passes through the control valve 255, the line 261, freely through the bypass valve 262, the lines 263 and 264 into the cylinder 245, actuating it so as to withdraw the tailstock barrel 239 from the work piece. As this cylinder withdraws the barrel 239 a dog 265 on its rod 244 actuates and opens the normally closed valve 267 at the time the barrel is completely withdrawn. Fluid pressure from the line 263 then passes through line 268, the valve 267, and line 269 connected to the valve 262 causing this valve to be actuated so as to close off line 263 and connect the pressure from line 261 to line 270 through which it passes to actuate the cylinder 235 to withdraw the tailstock 9 from working position. Fluid is at this time exhausted from the cylinder 235 through lines 271 and 272, the valve 273, the line 274, the control valve 255, and into the drain line 194.

After the finished work piece has been removed and an unfinished piece inserted in the lathe, the control lever 247 is moved to "unclamp" position actuating control valve 255 so that fluid pressure from the line 192 passes into line 274, freely through valve 273, and lines 272 and 271, into the cylinder 235, thus moving the tailstock into working position. As the tailstock reaches work position a dog 275 on the rod 238 of the cylinder 235 actuates and opens the normally closed valve 276 allowing pressure from line 272 to flow through line 277, the valve 276, into line 278 connected to valve 273, thus actuating valve 273 to connect pressure from line 274 to line 279 which passes through the pressure reducing valve 280, and the line 281 into the cylinder 245 to move the barrel 239 to working position. Under these conditions the work piece, held between the centers 240 of tailstock 9 and center 281 of tailstock 8, by manipulating handwheel 282 of tailstock 8 to shift its barrel 283 since the barrel 239 of tailstock 9 is free to float against the fluid pressure of cylinder 245, which pressure may be appropriately adjusted by means of the valve 280.

After having properly adjusted the work axially of the lathe, the control lever 247 is then moved to the "clamp" position to effect operation of the clamping mechanism for the tailstock barrel as described above.

The feeding of the cutting tools relative to the work is effected by fluid pressure derived from the fluid pressure pump 188. Noting particularly Figure XX, after work has been properly loaded in the lathe as described the "run" button 284 (Figure I) is pressed starting up the main drive motor 13. The tool feed "in" button 285 is then pressed which energizes the solenoid 286 of the normally closed spring centered control valve 287 so that fluid pressure from line 192 is connected to line 288 and 289 to the feeding cylinder 109 moving its piston 110 and rod 111 to the right (Figures XI and XX) actuating the rack bar 112 to move the various tool feeding members as described. Pressure from line 288 is also applied to the vibration damping cylinders 99, 100, and 101 through the line 290. During the initial stages of this movement fluid is discharged from the cylinder 109 through line 291, freely through the needle valve 292, lines 293 and 294, freely through the normally open valve 295, line 296, and through the valve 287 into the drain line 194. At this time the solenoid 297a of the normally closed slow traverse valve 297 is energized so that fluid can pass from line 291 through the needle valve 292 at a predetermined restricted amount into line 298 and through valve 297 into the drain line 194.

As this forward rapid traverse movement of the piston 110 continues, a dog 299 carried on the rack bar 122 engages and actuates the valve 295 closing off fluid flow from line 294 to line 296 thus making it necessary for fluid from line 293 to pass through line 300, the feed rate control valve 301, and the line 302 into the line 296, this valve 301 being adjustable to restrict the flow from line 300 into line 302 to give the proper desired rate of fine feed desired for the cylinder 109. In practice, the dog 299 is ordinarily set to cut off the rapid traverse movement at a point where the cutting tools would strike the crankshafts which have their rough surfaces extending furthest from the axis of the work spindle so as to prevent damage to the tools if fed too far at rapid traverse speed to the work. It is found, however, that these rough crankshafts vary in size and radial extent so greatly that it is desirable to rapid traverse much further on some of the shafts than on others. In order to accomplish this in conjunction with the rapid traverse arrangement above described a slow traverse arrangement is provided. In order to effect this slow traverse after valve 295 has been actuated by dog 299, the tool feed "in" button 285 is held in manually which causes the solenoid 297a of valve 297 to remain energized so long as the button 285 is held in. Thus fluid from line 291, which cannot escape through valve 295 actuated by the dog 299 and can only pass very slowly through valve 301, can pass at a moderate rate through the needle valve 292, into line 298 and then through valve 297 into the drain line 194 to effect a slow traverse of the cutting tools to the work. Under these conditions, as soon as the operator notices the tools beginning to cut on the work, he releases the button 285 thus allowing the tools to proceed at their regular feeding rate. In order to prevent damage to the machine in the event the operator held the push button 285 until all of the tools would engage the work piece at traverse speed, a limit switch LS—5 is provided which is arranged to be engaged by a dog 303 on the rack bar 112 so as to deenergize the solenoid 297a of the valve 297 before the tools have traversed this far even though the operator continued to hold the button 285.

At the completion of the "in" feeding a dog 304 on the rack bar 112 actuates the limit switch LS—6 which cuts off power from the main drive motor 13 whereupon limit switches LS—1 and LS—2 become operative to effect stopping of the center drive gears as already described. As the index plunger 220 is inserted in the disc 221 the limit switch LS—4 (Figure XX) is actuated which causes the solenoid 305 of the valve 287 to be energized while solenoid 286 of this valve is deenergized to effect return of the cutting tools to starting position. Fluid pressure from line 192 then passes through valve 287 into line 296 freely through valve 295, and lines 294, 293, and 291 in cylinder 109 while fluid is exhausted from the cylinder through line 289 and 288, the valve 287, and into the drain line 194. Fluid displaced from the vibration damping cylinders 99, 100, and 101 is discharged at this time through line 290 and 288, the valve 287, and into the drain line 194.

The solenoid 305 may be energized at any time to withdraw the tools by pressing the tool feed "out" push button 306 and the entire machine stopped instantly at any time by "hitting" the "stop" button 307.

Having thus fully set forth and described my invention, what I claim and desire to secure by United States Letters Patents is:

1. In a crankshaft lathe for machining all of the line bearing portions of a crankshaft, a base, tailstocks mounted on said base, center drive mechanism mounted on said base between said tailstocks, tool units mounted on said base and associated with said center drive mechanism, roughing tool feeding devices carried in said tool units for feeding appropriate roughing tools to all of the line bearing portions of a crankshaft held by said tailstocks and center drive mechanism, a finishing tool cradle mounted on said tailstocks adapted to feed finishing tools relative to all of the line bearing portions of said crankshaft, and means for simultaneously effecting feeding motions in said tool feeding device for simultaneously rough turning and finish turning said crankshaft in said lathe.

2. In a crankshaft lathe for simultaneously machining all of the line bearing portions of a crankshaft, a base, tailstocks mounted on said base, means for moving at least one of said tailstocks to and from alignment with the work spindle axis of said lathe, center drive chucking mechanism mounted on said base between said tailstocks, tool carrier units mounted on said base and associated with said center drive chucking mechanism, tool feeding devices in said units for feeding appropriate roughing tools for simultaneously roughing out all of the line bearing portions of a crankshaft held by said tailstocks and center drive chucking mechanism, a finishing tool feeding device mounted on said base and straddling said center drive chucking mechanism, finishing tools mounted on said last mentioned feeding device for simultaneously finish machining all of the line bearing portions of said crankshaft, and means for simultaneously effecting feeding of all of said tool feeding devices.

3. In a crankshaft lathe, a base, a pair of tailstocks mounted at each end of said base, center drive chucking mechanism located on said base between said tailstocks, tool units associated with said center drive chucking mechanism, tool feeding devices in said units arranged for feeding appropriate roughing tools for simultaneously roughing out all of the line bearing portions of a crankshaft held by said tailstocks and center drive chucking mechanism, a finishing tool feeding device mounted for movement on the base of said lathe having finishing tools adapted to simultaneously operate upon the crankshaft with said roughing tools, means for moving one of said tailstocks out of alignment with the work spindle axis of said lathe, and a loading device rendered effective for loading and unloading work from said lathe by the movement of said tailstock out of alignment with said work spindle axis.

4. In a lathe, a frame, a pair of tailstocks mounted on said frame, center drive chucking mechanism mounted on said frame between said tailstocks, tool units associated with said center drive chucking mechanism and mounted on said frame, tool feeding devices in said unit arranged to feed appropriate roughing tools for roughing out the line bearing portions of a crankshaft held by said tailstocks and center drive chucking mechanism, a finishing tool feeding device mounted on said frame adapted to feed appropriate finishing tools simultaneously to the line bearing portions of said crankshaft as said roughing tools are operating thereon, means for moving one of said tailstocks out of alignment with said work spindle axis, and means on said tailstock to facilitate loading or unloading said crankshafts from said lathe when said tailstock is withdrawn from axial alignment with said work spindle axis.

5. In a crankshaft lathe, a frame, a pair of tailstocks mounted at each end of said frame, center drive chucking devices mounted between said tailstocks, tool units mounted on said base and associated with said center drive chucking mechanism, tool feeding devices in said units affective for feeding roughing tools relative to a crankshaft held by said tailstocks and center drive chucking mechanism, a finishing tool feeding cradle mounted on said tailstocks at the front of said lathe, finishing tools mounted on said cradle, means for actuating said cradle to feed said finishing tools to the line bearing portions of said crankshaft in the lathe, means for effecting movement of one of said tailstocks to and from axial alignment with the work spindle axis of said lathe, and loading means rendered effective when said tailstock is moved from alignment with the work spindle axis for loading or unloading work from said center drive chucking mechanism.

6. In a lathe, a frame, a pair of tailstocks mounted on said frame, a finishing tool cradle pivotally mounted on said frame between said tailstocks, center drive chucking mechanism mounted on said frame, said finishing tool cradle straddling said center drive mechanism and carrying finishing cutting tools thereon, and means for feeding said cradle to effect a cutting operation on a work piece held by said tailstocks and center drive mechanism.

7. In a lathe, a frame, tailstocks mounted on said frame, center drive chucking mechanism mounted on said frame, a tool feeding device mounted on and between said tailstocks and straddling said center drive chucking mechanism, tools on said tool feeding device, and means on said frame for effecting feeding movement in said feeding device for applying said cutting tools to a work piece held by said tailstocks and said center drive chucking mechanism.

8. In a lathe, a frame, tailstocks mounted on said frame, center drive chucking mechanism mounted on said frame, a tool feeding cradle movably mounted on said frame between said tailstocks and straddling said center drive chucking mechanism, cam means in said frame for effecting feeding movement in said cradle, positive stop abutment means on said frame for accurately limiting the extent of feeding movement of said cradle, and cam means on said frame for actuating said cradle to feed cutting tools mounted thereon relative to a work piece held by said tailstocks and center drive chucking mechanism.

9. In a lathe, a frame, a pair of tailstocks mounted on said frame, center drive chucking mechanism mounted on said frame, a tool feeding cradle mounted on said frame for movement relative to a work piece held by said tailstocks and center drive chucking mechanism, means on said frame for effecting feeding movements in said cradle, resilient means interconnecting said frame and said cradle for damping out vibration in said cradle during feeding movements thereof, and tools mounted on said cradle adapted to engage a work piece in said lathe.

10. In a lathe, a frame, tailstocks mounted on said frame, center drive chucking mechanism mounted on said frame, a tool feeding cradle mounted on said frame for relative feeding to a work piece held by said tailstocks and center drive chucking mechanism, cutting tools mounted on said cradle, a coolant distributing manifold incorporated in said cradle, discharge orifices connected to said manifold and associated with said cutting tools, and a source of coolant supply connected to said cradle whereby coolant may be discharged to said cutting tools during the relative feeding of said cradle and a work piece in the lathe.

11. In a lathe, a frame, tailstocks mounted on said frame, center drive chucking mechanism mounted on said frame, a tool feeding cradle mounted on said frame and associated with said tailstocks and center drive chucking mechanism so as to form a chip guard for the front of said lathe, and means on said frame for effecting relative feeding of said cradle and a work piece held by said tailstocks and center drive chucking mechanism.

12. In a lathe, a base, a pair of tailstocks mounted on said base, center drive chucking mechanism mounted on said base, a tool feeding cradle pivotally mounted on said tailstocks, cam means on said base for effecting tilting movements of said cradle to feed appropriate cutting tools mounted on said cradle relative to a work piece held by said tailstocks and center drive chucking mechanism, coolant distributing mechanisms incorporated in said cradle for applying coolant to said cutting tools, said cradle being arranged to straddle said center drive chucking mechanisms and to extend between each tailstock so as to form a chip and coolant guard for the front of said machine.

13. In a center drive crackshaft lathe for machining the line bearing portions of the crankshaft, a base, a tailstock mounted on each end of said base, center drive chucking mechanism mounted on said base between said tailstocks, tool units mounted on said base and associated with said center drive chucking mechanism, tool feeding devices in said tool units having tools arranged for feeding relative to a crankshaft held in said tailstocks and center drive chucking mechanism, a tool feeding cradle mounted on said base between said tailstocks and straddling said center drive chucking mechanism, cutting tools mounted on said cradle arranged to engage a work piece in said lathe, means on said base for effecting feeding movements in said cradle, and means for effecting simultaneously operation of all of said tool feeding devices.

14. In a crankshaft lathe for machining the line bearing portions of a crankshaft, a base, a pair of tailstocks mounted on said base, a pair of center drive chuck housings mounted on said base between said tailstocks, a tool feeding cradle mounted on said base between said tailstocks and straddling said center drive chuck housings, pedestals formed on said cradle extending each side of and between said center drive chucking devices, tools mounted on said pedestals for engagement with a work piece in said lathe, and means on said base for effecting feeding movements in said cradle.

15. In a center drive crankshaft lathe adapted to machine the line bearing portions of the crankshaft, a base having an inclined upper surface, tailstocks mounted on said surface at each end of said base, center drive chuck housings mounted on said surface and between said tailstocks, tool carrier units fixed to said angular surface and also fixed to said center drive chuck housings to form a solid block of metal extending parallel with the axis of the rotation of the lathe work spindle, a tool feeding cradle pivotally mounted on the bases of said tailstocks and straddling said center drive chuck housings, tool supporting pedestals formed integral with said cradle and extending between and each side of said center drive chuck housings, cutting tools mounted on said pedestals, means on said base for feeding said cradle to and from a work piece held by said tailstocks and center drive chucking devices in said center drive chuck housings, and means carried by said center drive chuck housings and tool units for effecting feeding movements of the tool feeding devices in said tool units.

16. In a lathe, a base, a center drive chuck housing mounted on said base, tool units mounted on said base and associated with said center drive housing, a pair of tool bars in each of said tool units, cam means for actuating said tool bars in opposite directions to effect feeding of cutting tools mounted on said bars from opposite directions relative to an axis of rotation of the work spindle of the lathe, and means for constantly urging one of said bars toward said axis of rotation irrespective of the movement of the cam means for actuating said tool bars.

17. In a lathe, a base, a tool bar unit mounted on said base, a rotatable work spindle associated with said tool bar unit, a pair of tool bars mounted in said unit, cam means for actuating said tool bars in opposite directions, and vibration damping means engaging one of said tool bars for constantly urging it towards the axis of rotation of said work spindle during the movement of said cam actuating mechanism.

18. In a lathe, a frame, tool feeding members movable in said frame relative to the axis of rotation of the work spindle of said lathe, cam means located to one side of the axis of rotation of said work spindle, means on said cam means being arranged to actuate said tool bars in opposite directions, tools on said tool bars located each side of said axis, the tools on one bar being located to one side of the axis of rotation of said work spindles, the tools on other of said bars being located to the other side of said axis, and vibration damping means engaging one of said tool bars to urge it constantly toward said axis regardless of the movements of said cam actuating means.

19. In a lathe, a frame, a pair of oppositely reciprocable tool bars slidably mounted in said frame, a rotatable work spindle associated with said tool bars, cutting tools on said tool bars, mounted each side of said work spindle cam means, for actuating each of said tool bars, located to one side of the axis of rotation of said work spindle, cutting tools on one of said tool bars located on the opposite side of said work spindle from said cam means, cutting tools mounted on the other of said tool bars on the same side of said work spindle as said cam means, and resilient means engaging said tool bar having its tools on the same side of the axis of rotation as that of said cam means for at all times urging said tool bar toward the axis of rotation of the work spindle.

20. In a lathe, a frame, a pair of oppositely reciprocatable tool bars mounted in said frame having cutting tools for movement to and from the axis of rotation of a work spindle associated with said tool bars, common cam means for actuating said tool bars in reciprocatory movements, and fluid pressure means engaging one of said tool bars whereby all back lash is removed from the feeding mechanism for said tool bars.

21. In a lathe, a frame, a tool bar unit mounted on said frame, a rotatable work spindle associated with said tool unit, a pair of oppositely reciprocatable tool bars mounted in said tool bar unit, cutting tools on one of said bars located to one side of the axis of rotation of said work spindle, cutting tools on the other of said tool bars located to the other side of the axis of rotation of said tool bars, common cam means for actuating both of said tool bars, and fluid pressure means engaging one of said tool bars for constantly urging said bar relative to the axis of rotation of said work spindle.

22. In a lathe, a base, center drive chuck housings mounted on said base, tool bar units mounted on said base and connected together with said center drive housings to form a solid block of metal fixed on said base, cam means mounted in said housings and units, cams on said cam means for actuating tool bars in said tool units, and vibration damping means associated with said tool bars for eliminating all back lash and vibration in said cam feeding mechanism while said cams are feeding said tool bars in said tool units relative to a work piece in said lathe.

23. In a lathe, a base, center drive housings mounted on said base, tool bar units mounted on said base each side of and between said center drive chuck housings, tool bars in each of said tool bar units arranged for opposite reciprocatable movement relative to a work piece in the chucking devices of said center drive chucking housings, cam means mounted on said housings and tool units, cams on said cam means for actuating each of said tool bars at a plurality of different and independent variable speed rates, fluid pressure vibration damping means associated with each of the bars operating in the same direction for eliminating all back lash in said cam feeding mechanism, and common fluid pressure means for actuating said vibration damping means and for moving said cam actuating mechanism.

24. In a crankshaft lathe, a frame, center drive chuck housings mounted on said frame, tool bar units mounted in said frame, a tool feeding cradle mounted on said frame and straddling said center drive chuck housings, tailstocks mounted each side of said center drive chuck housings, cam means for actuating tool bars in said tool units, cam means for actuating said tool feeding cradle, mechanical means interconnecting said cam means, and hydraulic actuating means for said mechanical means.

25. In a lathe, a frame, upper and lower oppositely reciprocatable tool bars in said frame, cutting tools on each of said tool bars, cam means for actuating each of said tool bars so as to feed their respective tools to a work piece in said lathe, a fluid pressure means comprising a cylinder having a plunger engaging said upper tool bar, and fluid pressure means for actuating said cam actuating means and said plunger for urging said upper tool bar in the direction of its relative feeding to a work piece in the lathe.

26. In a lathe, a frame, a tool bar slidably mounted in said frame, a cutting tool on said tool bar for engaging a work piece in said lathe, cam means for actuating said tool bar, a cam roller mounted on said tool bar operating in said cam means, and eccentric mounting means for said cam roller on said tool bar whereby relative adjustment may be effected between said tool bar and said cam roller means for accurately adjusting said cutting tools relative to a work piece in said lathe.

27. In a crankshaft lathe, a base, tailstocks mounted on each end of said base, center drive chuck housings mounted on said base between said tailstocks, tool feeding units mounted on said base and associated with said center drive chuck housings, a tool feeding cradle mounted on said base straddling said center drive chucks and located between said tailstocks, cutting tools mounted on tool bars in said tool units, cutting tools mounted on pedestals on said tool feeding cradle, means for moving one of said tailstocks away from alignment with the axis of rotation of center drive chucks in said housings, means for stopping said chucks accurately at a predetermined position, and means for loading and unloading work in said center drive chucks when said tailstock is withdrawn from alignment with said center drive chuck.

28. In a lathe, a base, a pair of center drive chuck housings mounted on said base, tool units mounted on said base and associated with said center drive chuck housings, tailstocks mounted on said base each side of said housings and tool units, a tool feeding cradle mounted on said base straddling said center drive chuck housings and located between said tailstocks, cutting tools mounted on said cradle, tool feeding bars mounted in said tool units, cutting tools mounted on said bars, cam means for actuating said bars for feeding their respective tools relative to a work piece held by said center drive chucks in said housings and said tailstocks, cam means for actuating said tool feeding cradle for feeding respective tools relative to said work piece, mechanical means interconnecting said cam means, and fluid pressure means for actuating said mechanical means, fluid pressure means for moving at least one of said tailstocks to or from axially aligned position with said center drive chucks, fluid pressure means for rotating said center drive chucks to a predetermined position for loading and unloading work therein when said tailstock is removed from axial alignment therewith and fluid pressure means for damping the vibration of certain of said tool feeding devices of said lathe.

29. In a lathe, a rotatable work spindle, an electric driving motor for rotating said spindle, a hydraulic braking motor connected to said electric motor, fluid pressure means for rotating said braking motor at a predetermined slow speed, an indexing disc associated with said work spindle, said disc having a notched portion and a radially extending abutment surface in its periphery, means for rotating said indexing disc in timed relation with said work spindle, an indexing plunger associated with said disc and having an abutment surface adapted to engage the abutment surface of said disc, fluid pressure control means for actuating said indexing plunger to cause it to enter said slot in said disc when said hydraulic braking motor is rotating said electric motor, and means for continuing actuation of said hydraulic braking motor when said abutment of said indexing plunger is in engagement with said abutment of said indexing disc to maintain said abutments in constant contact for arresting rotation of said work spindle in a predetermined position.

30. In a lathe, cutting tools and means for feeding said cutting tools in a plane angularly related to a horizontal plane passing through the axis of the work spindle of said lathe, said tools being fed from opposite directions from each side of a work piece in said spindle, means for feeding a third set of tools in a plane substantially perpendicular to said first mentioned plane and passing through the axis of rotation of said work piece in the lathe, means for withdrawing all of said cutting tools radially away from said work piece whereby work may be loaded axially past said cutting tools while said work piece is maintained substantially on the axis of rotation of the work spindle of the lathe.

31. In a lathe, a rotatable work spindle, a work piece in said work spindle, cutting tools mounted for movement relative to said work piece and from each side thereof in a plane angularly related to a horizontal plane of said lathe and passing through the axis of rotation of said work piece, other sets of cutting tools operating relative to said work piece in a plane passing through the axis of rotation of said work piece said second mentioned plane being substantially perpendicular to the plane of operation of said first mentioned tools, means for simultaneously withdrawing all of said tools radially away from said work piece to facilitate loading of said work piece into or out of said lathe while said work is maintained substantially on the axis of rotation of said work spindle.

32. In a lathe, a frame, a pair of oppositely reciprocatable tool bars mounted in said frame, cutting tools on said tool bars for engaging a work piece in said lathe from opposite sides, a third set of cutting tools mounted on a tool holder for engagement of said work piece in a direction substantially perpendicular to that of said first mentioned tool, and means for feeding said third mentioned set of tools relative to said work piece by the movement of one of said tool bars first mentioned.

33. In a lathe, a frame, a pair of oppositely reciprocatable tool bars slidably mounted in said frame, cutting tools mounted on each of said tool bars for movement relative to a work piece in the lathe from opposite sides, a third tool holder pivotally mounted on said frame, cam means mounted on one of said tool bars engaging said tool holder, and means associated with said other tool bar for actuating said cam means to effect the feeding of said tool holder relative to said work piece in said lathe.

34. In a lathe, a frame, a pair of oppositely reciprocatable tool bars slidably mounted in said frame, cutting tools mounted on each of said tool bars for movement relative to a work piece in the lathe from opposite sides, a third tool holder mounted on said frame for movement relative to said work piece in a direction substantially perpendicular to the direction of movement of said tool bars, and a fourth set of cutting tools for finish turning that which has been rough turned by said first mentioned tool means and operating in a direction opposing that of said third mentioned tool holder.

35. In a lathe, a rotatable work spindle, a pair of oppositely moving cutting tools operating in a straight line adapted to engage a work piece in said work spindle from opposite sides, a pair of cutting tools operating in an arcuate path substantially perpendicular to the direction of movement of said first mentioned tools and from opposite sides of said work piece, means for feeding all of said tools relative to said work piece, and means for rotating said work spindle.

36. In a machine tool, a work holder, a tool holder, a cutting tool in said tool holder, fluid pressure motive means for effecting relative movement between said work holder and tool, fluid pressure control means to cause said actuating means to effect relative rapid traverse movement of work holder and tool for a predetermined distance, momentary contact manual operating means for rendering said control means operative when momentarily operated, and means for effecting a greater distance of rapid traverse movement than said predetermined movement by continuously manually actuating said momentary contact operating means.

37. In a lathe, a frame, a pair of tailstocks mounted on said frame, a tool cradle mounted on said frame between said tailstocks, center drive chucking mechanism mounted on said frame, said tool cradle straddling said center drive mechanism and carrying cutting tools thereon, and means for feeding said cradle to effect a cutting operation on a work piece held by said tailstocks and center drive mechanism.

WILLIAM F. GROENE.